(12) United States Patent
Luehrs

(10) Patent No.: US 7,690,012 B2
(45) Date of Patent: Mar. 30, 2010

(54) POSITIVE PARENTAL CONTROL

(75) Inventor: Douglas Richard Luehrs, Atlanta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 2017 days.

(21) Appl. No.: 10/085,411

(22) Filed: Feb. 28, 2002

(65) Prior Publication Data

US 2003/0163811 A1 Aug. 28, 2003

(51) Int. Cl.
*H04N 7/16* (2006.01)
(52) U.S. Cl. .............................. 725/28; 725/25; 725/27
(58) Field of Classification Search .............. 725/25–28, 725/30, 50, 89, 37–59; 707/9
See application file for complete search history.

(56) References Cited

U.S. PATENT DOCUMENTS

| | | | | |
|---|---|---|---|---|
| 5,548,345 | A * | 8/1996 | Brian et al. ..................... | 725/27 |
| 5,969,748 | A * | 10/1999 | Casement et al. ............. | 725/27 |
| 5,973,683 | A * | 10/1999 | Cragun et al. ................ | 715/719 |
| 6,037,969 | A | 3/2000 | Lim et al. ..................... | 348/5.5 |
| 6,163,272 | A | 12/2000 | Goode et al. ............ | 340/825.34 |
| 6,209,131 | B1 * | 3/2001 | Kim et al. ...................... | 725/50 |
| 6,321,381 | B1 * | 11/2001 | Yuen et al. ..................... | 725/28 |
| 6,505,348 | B1 | 1/2003 | Knowles et al. ............... | 725/49 |
| 6,681,396 | B1 * | 1/2004 | Bates et al. .................... | 725/58 |
| 6,701,523 | B1 * | 3/2004 | Hancock et al. ............... | 725/25 |
| 6,763,522 | B1 * | 7/2004 | Kondo et al. .................. | 725/39 |
| 6,922,843 | B1 * | 7/2005 | Herrington et al. ............ | 725/30 |
| 2002/0174430 | A1 * | 11/2002 | Ellis et al. ...................... | 725/46 |
| 2004/0175121 | A1 * | 9/2004 | Ellis et al. ...................... | 386/83 |

OTHER PUBLICATIONS

Pending U.S. Appl. No. 10/008,399, filed Dec. 6, 2001, Title: "Prediction Based Adaptive Control of Television Viewing Functionality," Inventor: Arturo A. Rodriguez.
Pending U.S. Appl. No. 10/015,270, filed Dec. 11, 2001, Title: "Time Adaptive Control of Television Viewing Functionality," Inventors: Arturo A. Rodriguez, Geoffrey G. Hammett, Robert O. Banker, and John Eric West.

* cited by examiner

*Primary Examiner*—Christopher Kelley
*Assistant Examiner*—Timothy R Newlin
(74) *Attorney, Agent, or Firm*—Lewinski Law Group LLC

(57) ABSTRACT

A system for controlling viewer access to media content, the system comprising a memory with logic and a processor configured by the logic to provide interactive user interfaces that enable an administrator to positively define media content for access by a user. The processor is further configured by the logic to enable the user to access the media content as defined by the administrator.

13 Claims, 28 Drawing Sheets

Parent/Administrator IPG

FOX
3

LITTLE MERMAID
4:30 PM - 5:30 PM

| channel | 4:30 PM | 5:00 PM | 5:30 PM | 6:0 |
|---|---|---|---|---|
| Disney 400 | Pluto's Goof 🔒 | Donald Duck & Daisy & Family 🔒 | American History | Beach |
| Disney 401 | ◀ Dumbo | | Who wants to be a Millionare | 🔒 |
| Disney 402 | Mickey and Friends | | Disney on Ice | 🔒 |
| FOX 3 | Little Mermaid | | Buffy The Vampire | 🔒 |
| WB 4 | The Simpsons 🔒 | Friends | | |
| tue 7/1 | ▲ Browse by | 🅑 Approve | © Return to enabled access main screen | |

FIG. 10A

Parent/Administrator IPG

FOX
3

LITTLE MERMAID
4:30 PM - 5:30 PM

| channel | 4:30 PM | 5:00 PM | 5:30 PM | 6:0 |
|---|---|---|---|---|
| | | | Tue 7/1 12:01 PM | |
| Disney 400 | Pluto's Goof 🔒 | Donald Duck & Daisy & Family 🔒 | | Beach |
| Disney 401 | ◀ Dumbo | | American History 🔒 | |
| Disney 402 | Mickey and Friends | | Who wants to be a Millionare 🔒 | |
| FOX 3 | Little Mermaid | 🔒 | Disney on Ice 🔒 | |
| WB 4 | The Simpsons 🔒 | Friends | Buffy The Vampire 🔒 | | tue 7/1  Ⓐ Browse by  Ⓑ Approve  Ⓒ Return to enabled access main screen

CHILD IPG

Disney
402

Mickey and Friends
4:30 PM - 5:30 PM
Join Mickey and Friends on
their latest adventures

| channel | 4:30 PM | ▲ 5:00 PM | 5:30 PM | 12:05 PM 6:0 |
|---|---|---|---|---|
| Disney 400 | Pluto's Goof | Donald Duck and | | |
| Disney 401 | ⏪ Dumbo | | | |
| Disney 402 | Mickey and Friends | | | |
| FOX 3 | Little Mermaid | | | |
| 4 | | | | | tue 7/1  　Ⓐ Browse by  　Ⓑ Date  　Ⓖ ↩

2500

POSITIVE PARENTAL CONTROL

CROSS-REFERENCE TO RELATED APPLICATION

This application is related to U.S. utility patent applications entitled "Prediction Based Adaptive Control of Television Viewing Functionality," filed on Dec. 6, 2001 and accorded Ser. No. 10/008,399, and "Time Adaptive Control of Television Viewing Functionality," filed on Dec. 11, 2001 and accorded a Ser. No. 10/015,270, both of which are entirely incorporated herein by reference.

TECHNICAL FIELD

The present invention is generally related to television systems, and, more particularly, is related to parental control.

BACKGROUND OF THE INVENTION

With recent advances in digital transmission technology, subscriber television systems are now capable of providing much more than traditional analog broadcast video. In implementing enhanced programming, the home communication terminal device ("HCT"), otherwise known as the set-top box, has become an important computing device for accessing media content services (and media content within those services) and navigating a user through a maze of available services. In addition to supporting traditional analog broadcast video functionality, digital HCTs (or "DHCTs") now also support an increasing number of two-way digital services such as video-on-demand and personal video recording.

Typically, a DHCT is connected to a cable or satellite, or generally, a subscriber television system, and includes hardware and software necessary to provide the functionality of the digital television system at the user's site. Some of the software executed by a DHCT may be downloaded and/or updated via the subscriber television system. Each DHCT also typically includes a processor, communication components, and memory, and is connected to a television or other display device, such as a personal computer. While many conventional DHCTs are stand-alone devices that are externally connected to a television, a DHCT and/or its functionality may be integrated into a television or personal computer or even an audio device such as a programmable radio, as will be appreciated by those of ordinary skill in the art.

DHCTs are typically capable of providing users with a very large number and variety of media content choices. As the number of available media content choices increases, so does the possibility that users will be exposed to what some users would consider to be inappropriate media content. Current parental controls require the parent and/or administrator to constantly update the prior defined exclusions, and thus there exists the real risk of exposure to inappropriate content. Therefore, there exists a need for parental control mechanisms that further reduce the risk of exposure to inappropriate media content.

Thus, a heretofore unaddressed need exists in the industry to address the aforementioned deficiencies and inadequacies.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 10A is a screen diagram of an example administrator IPG screen evoked from the enabled access screen of FIG. 9A, in accordance with one embodiment of the invention.

FIG. 10B is a screen diagram of an administrator IPG screen resulting from selecting one of the titles in the example screen of FIG. 9A for enabled access, in accordance with one embodiment of the invention.

FIG. 25 is a screen diagram of an example Interactive Program Guide (IPG) for a child authorization level, in accordance with one embodiment of the invention.

DETAILED DESCRIPTION OF THE PREFERRED EMBODIMENTS

The preferred embodiments of positive parental control now will be described more fully hereinafter with reference to the accompanying drawings, in which preferred embodiments of positive parental control are shown. Positive parental control can generally be described as a system that provides an administrator, such as a parent, with the ability to control the viewing experience for others. As will be described in more detail below, the administrator can control the viewing experience by enabling user access only to media content that the administrator deems suitable for viewing. Thus, the administrator can select media content at the lowest level, such as at the media content instance level, like a broadcast program episode level (for example, from program selections from an interactive program guide (IPG)), for enabled viewing. Thus media content is not available for viewing unless the administrator enables viewing. This is in contrast to current parental control mechanisms, which exclude content.

FIGS. 1-5 will provide an overview of an example system in which positive parental control can be implemented, with the remaining diagrams providing example illustrations of the various user interface screens that can guide an administrator in implementing positive parental control. Positive parental control may, however, be embodied in many different forms and should not be construed as limited to the embodiments set forth herein; rather, these embodiments are provided so that this disclosure will be thorough and complete, and will fully convey the scope of positive parental control to those having ordinary skill in the art. Furthermore, all "examples" given herein are intended to be non-limiting, and are provided as an exemplary list among many other examples contemplated but not shown.

Figure 1:
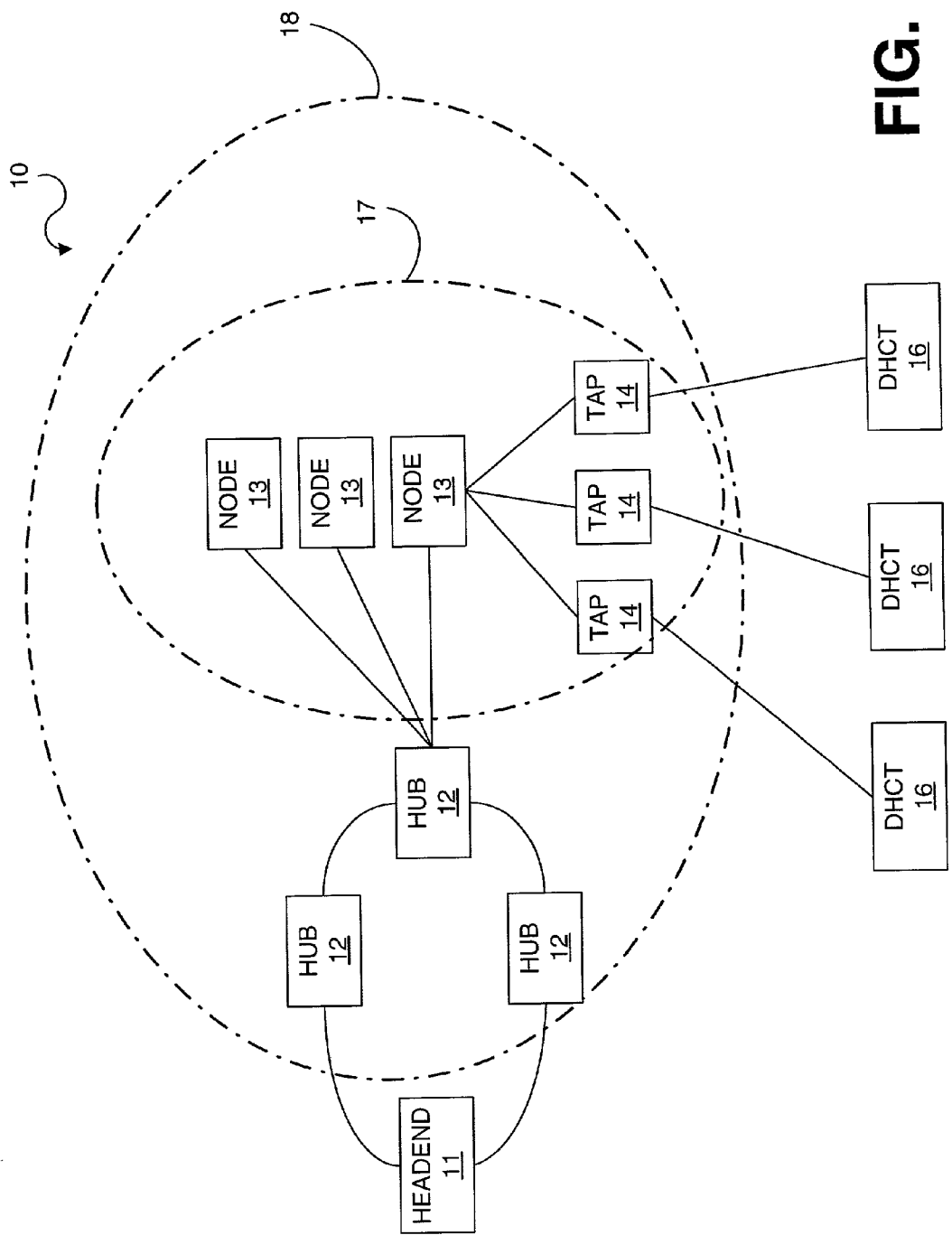
FIG. 1 is a block diagram of an example subscriber television system (STS), in accordance with one embodiment of the invention.

One embodiment of the invention is generally implemented as part of a subscriber television system (STS), which includes digital broadband delivery systems (DBDS) and cable television systems (CTS). As a non-limiting example, a subscriber television system (STS) and its operation will be described initially, with the understanding that other conventional data delivery systems are within the scope of the preferred embodiments of the invention. FIG. 1 shows a block diagram view of an STS 10, which is generally a high quality, reliable and integrated network system that is typically capable of delivering video, audio, voice and data services to digital home communication terminals (DHCTs) 16. Although FIG. 1 depicts a high level view of an STS 10, it should be appreciated that a plurality of subscriber television systems can tie together a plurality of regional networks into an integrated global network so that DHCT users can receive media content provided from anywhere in the world. Further, it will be appreciated that the STS 10 shown in FIG. 1 is merely illustrative and should not be construed as implying any limitations upon the scope of the preferred embodiments of the invention. For instance, subscriber television systems also included within the scope of the preferred embodiments of the invention include systems not utilizing physical structured cabling for transmission, such as, but not limited to, satellite systems. Further, transmission media included within the scope of the preferred embodiments of the invention include, but are not limited to, Hybrid Fiber/Coax (HFC), optical, satellite, radio frequency (RF), frequency modulated (FM), and microwave. Further, data provided from the headend 11 to the DHCTs 16 and programming necessary to perform the functions discussed below will be understood to be present in the STS 10, in accordance with the description below.

The STS 10 typically delivers broadcast video signals as digitally formatted signals in addition to delivering traditional broadcast analog video signals. Furthermore, the system can typically support one way broadcast services as well as both one-way data services and two-way media content and data services. The two-way operation of the network typically allows for user interactivity with services, such as Pay-Per-View programming, Near Video-On-Demand (NVOD) programming according to any of several known NVOD implementation methods, Video-on-Demand (VOD) programming (according to any of several VOD implementation methods), and interactive applications, such as Internet connections.

The STS 10 also provides the interfaces, network control, transport control, session control, and servers to access media content from media content services, and distributes media content to DHCT users. As shown in FIG. 1, a typical STS 10 comprises a headend 11, hubs 12, an HFC access network 17, nodes 13, taps 14, and DHCTs 16. It should be appreciated that although a single component (e.g. a headend) is illustrated in FIG. 1, the STS 10 can feature a plurality of any one of the illustrated components, can omit components, or may be configured with alternative embodiments for any one of the individual components or with yet other additional components not enumerated above.

Media content provided by one or more content providers (not shown) is communicated by the content providers to one or more headends 11. From those headends 11 the media content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 which is preferably connected to a digital home communication terminal (DHCT) 16. Coaxial cables are typically used to couple nodes 13 and taps 14 because the electrical signals can be easily repeated with RF amplifiers. As the high-level operations of many of the functions of an STS 10 are well known to those of ordinary skill in the art, further high level description of the overall STS 10 of FIG. 1 will not be contained herein.

Figure 2:
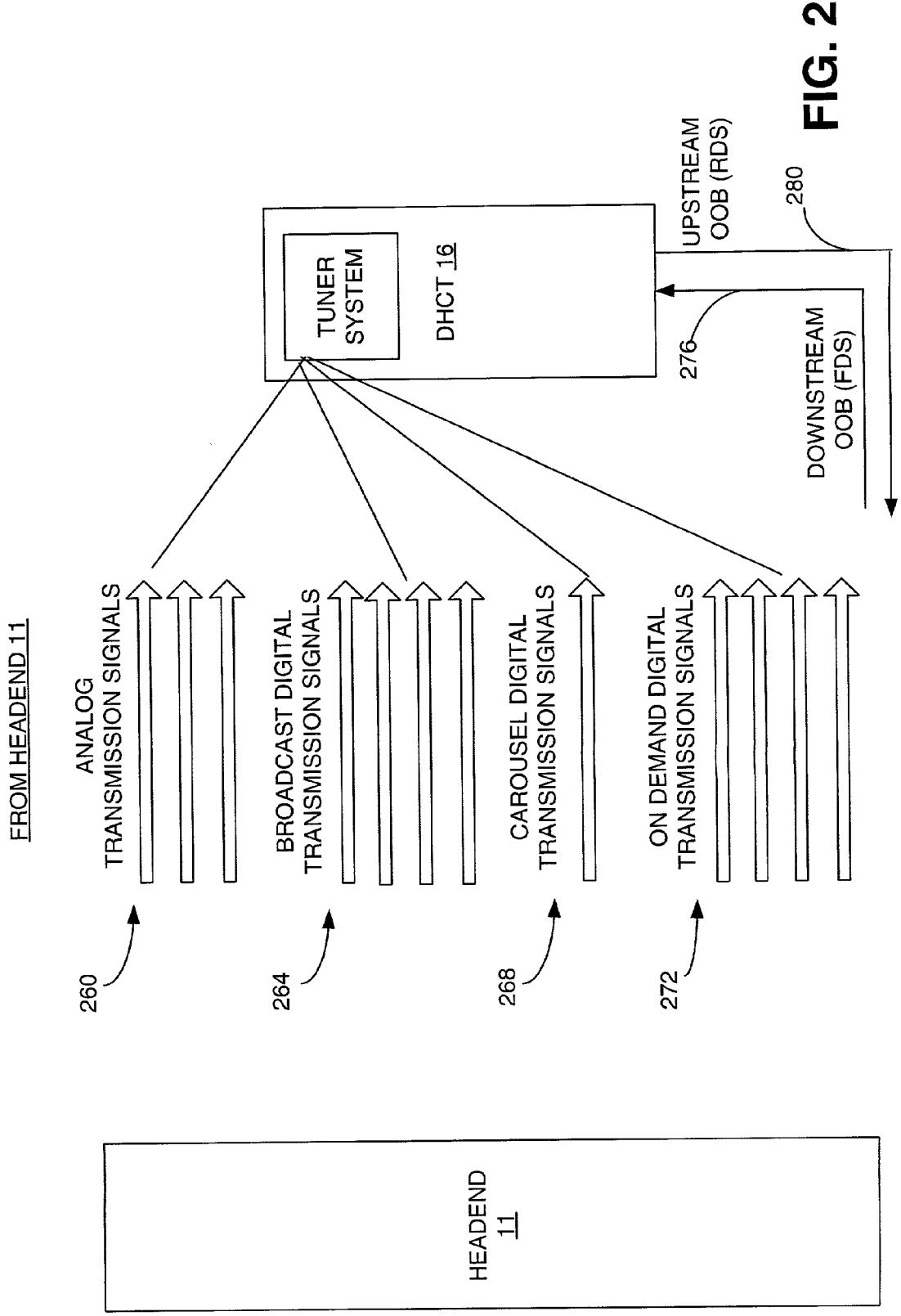
FIG. 2 is a block diagram illustration of the transmission signals supported by the STS of FIG. 1, and input into a digital home communication terminal (DHCT) from a headend, in accordance with one embodiment of the invention.

FIG. 2 is a block diagram illustrating the transmission signals supported by the STS 10 (FIG. 1), where the transmission signals 260, 264, 268, 272 and 276 are input into the DHCT 16 in accordance with one embodiment of the invention. One or more content providers (not shown) are the source of the information that is included in the transmission signals. Before passing through the network 17 (FIG. 1), transmission signals can be generated at a headend 11 or at a hub 12 (FIG. 1) that might function as a mini-headend and which therefore possesses some of the headend functionality.

As depicted in FIG. 2, the STS 10 (FIG. 1) can simultaneously support a number of transmission signal types, transmission rates, and modulation formats. The ability to carry analog and digital signals over a large bandwidth are characteristics of an HFC network typically employed in an STS, as in the STS 10 of FIG. 1. As will be appreciated by those of ordinary skill in the art, analog and digital signals in HFC networks can be multiplexed using Frequency Division Multiplexing (FDM), which enables many different types of signals to be transmitted over the STS 10 to the DHCT 16. Typically, an STS 10 using HFC supports downstream (i.e., in the direction from the headend 11 to the DHCT 16) frequencies from 50 mega-hertz (MHz) to 870 MHz, whereas upstream frequencies (i.e., in the direction from the DHCT 16 to higher levels of the system) are in the 5 MHz to 42 MHz band. Generally, the RF bandwidth spacing for analog and digital services is 6 MHz. Furthermore, for a typical 870 MHz system in the United States (U.S.), a possible downstream RF spectrum subdivision plan uses 6 MHz frequency subdivisions, or spans, within the 50 MHz to 550 MHz band for analog video transmission signals and within the 550 MHz to 870 MHz range for digital transmission signals.

Analog transmission signals (ATSs) 260 shown in FIG. 2 are typically broadcast in 6 MHz frequency subdivisions, typically referred to in analog broadcasting as channels, having an analog broadcast signal composed of analog video and analog audio, and include Broadcast TV Systems Committee (BTSC) stereo and Secondary Audio Program (SAP) audio. Referring again to FIG. 2, the downstream direction transmission signals, having been multiplexed, and in one embodiment using FDM, are often referred to as in-band transmission signals and include the ATSs 260 and Digital Transmission Signals (DTSs) 264, 268, 272 (also known as Digital Transport Signals). These transmission signals carry video, audio, and data services. For example, these transmission signals may carry television signals, Internet data, or any additional types of data, such as Interactive Program Guide (IPG) data. Additionally, as will be appreciated by those of ordinary skill in the art, additional data can be sent with the analog video image in the Vertical Blanking Interval (VBI) of the video signal and stored in DHCT memory or a DHCT local physical storage device (not shown). It should be appreciated, however, that the amount of data that can be transmitted in the VBI of the analog video signal is typically significantly less than data transmitted in a DTS.

Like the ATSs 260, the DTSs 264, 268, 272 each typically occupies 6 MHz of the RF spectrum. However, the DTSs 264, 268, 272 are digital transmission signals consisting of 64- or 256-Quadrature Amplitude Modulated (QAM) digital signals preferably formatted using Moving Picture Experts Group (MPEG) standards such as MPEG-2 transport streams, allocated in a separate frequency range. The MPEG-2 transport stream enables transmission of a plurality of DTS types over each 6 MHz RF subdivision, as compared to a 6 MHz ATS. The three types of digital transport signals illustrated in FIG. 2 include broadcast digital transmission signals 264, carousel digital transmission signals 268, and on-demand transmission signals 272.

MPEG-2 transport may be used to multiplex video, audio, and data in each of these DTSs. However, because an MPEG-2 transport stream allows for multiplexed video, audio, and data into the same stream, the DTSs do not necessarily have to be allocated in separate 6 MHz RF frequencies, unlike the ATSs 260 in one embodiment. On the other hand, each DTS is capable of carrying multiple broadcast digital media content instances, multiple cycling data carousels containing broadcast data, and data requested on-demand by the subscriber. Data is formatted, such as in Internet Protocol (IP), mapped into MPEG-2 packets, and inserted into the multiplexed MPEG-2 transport stream. Encryption can be applied to the data stream for security so that the data may be received only by authorized DHCTs. The authorized DHCT 16 is provided with the mechanisms to receive, among other things, additional data or enhanced services. Such mechanisms can include "keys" that are required to decrypt encrypted data.

Each 6 MHz RF subdivision assigned to a digital transmission signal (DTS) can carry the video and audio streams of the media content instances of multiple television (TV) stations, as well as media content and data that is not necessarily related to those TV media content instances, as compared to one TV channel broadcast over one ATS 260 that consumes the entire 6 MHz. The digital data is inserted into MPEG transport streams carried through each 6 MHz frequency subdivision assigned for digital transmission, and then demultiplexed at the subscriber DHCT so that multiple sets of data can be produced within each tuned 6 MHz frequency span, or subdivision.

Although broadcast in nature, the carousel DTSs 268 and on-demand DTSs 272 offer different functionality. Continuing with FIG. 2, the broadcast DTSs 264 and carousel DTSs 268 typically function as continuous feed for indefinite time, whereas the on-demand DTSs 272 are continuous feeds sessions for a limited time. In one embodiment, all DTS types are capable of being transmitted at high data rates. The broadcast DTSs 264 carry typical data comprising multiple digitally-MPEG-2 compressed and formatted TV source signals and other continuously fed data information. The carousel DTSs 268 carry broadcast media content or data that is systematically broadcast in a cycling fashion but updated and revised as needed. Thus, the carousel DTSs 268 serve to carry high volume data such as media content and data and possibly, other data at high data rates. The carousel DTSs 268 preferably carry data formatted in directories and files by a Broadcast File System (BFS) (not shown), which is used for producing and transmitting data streams throughout the STS 10, and which provides an efficient means for the delivery of application executables and application media content and data to the DHCT, as will be described below. Media content and data received by the DHCT 16 in such manner can then be saved in the DHCT memory and/or transferred to the DHCT storage device for later use. The on-demand DTSs 272, on the other hand, can carry particular information such as compressed video and audio pertaining to subscriber requested media content instance preview and/or media content instance descriptions, as well as other specialized data information.

Preferably, the User-to-Network Download Protocol of the MPEG-2 standard's DSM-CC specification (Digital Storage Media—Command and Control) provides the data carousel protocol used for broadcasting data from a server located at the headend 11, or located elsewhere. It also provides the interactive download protocol for reliable downloading of data from a server (possibly the same server) to an individual DHCT through the on-demand DTSs. Each carousel and on-demand DTS is preferably defined by a DSM-CC session. Therefore, some of the basic functionality reflected in the DHCT 16 when the DHCT does not have a local physical storage device is somewhat similar to a networked computer (i.e., a computer without a persistent storage device), in addition to traditional set top box functionality, as is well known to those of ordinary skill in the art. A DHCT 16 with a storage device reduces data access latency when the data is stored in the local physical storage device ahead of time.

Also shown in FIG. 2 are Out-Of-Band (OOB) signals that provide continuously available two-way signaling to the subscribers' DHCT 16 regardless of which in-band signals are tuned to by the individual DHCT in-band tuners. The OOB signals consist of a Forward Data Signal (FDS) 276 and a Reverse Data Signal (RDS) 280. The OOB signals can comply to any one of a number of well known transport protocols, but preferably comply to either a Digital Audio Visual Council (DAVIC)1.1 Transport Protocol with FDS of 1.544 megabits per second (Mbps) or more using quadrature phase shift keying (QPSK) modulation and an RDS of 1.544 Mbps or more using QPSK modulation; or to a Data Over Cable Service Interface Specification (DOCSIS) Transport Protocol with FDS of 27 Mbps using 64-QAM modulation and a RDS of 1.544 Mbps or more using QPSK modulation or 16-QAM modulation. The OOB signals provide the two-way operation of the network, which allows for subscriber interactivity with the applications and services provided by the network. Furthermore, the OOB signals are not limited to a 6 MHz spectrum, but generally to a smaller spectrum, such as 1.5 or 3 MHz.

Figure 3:
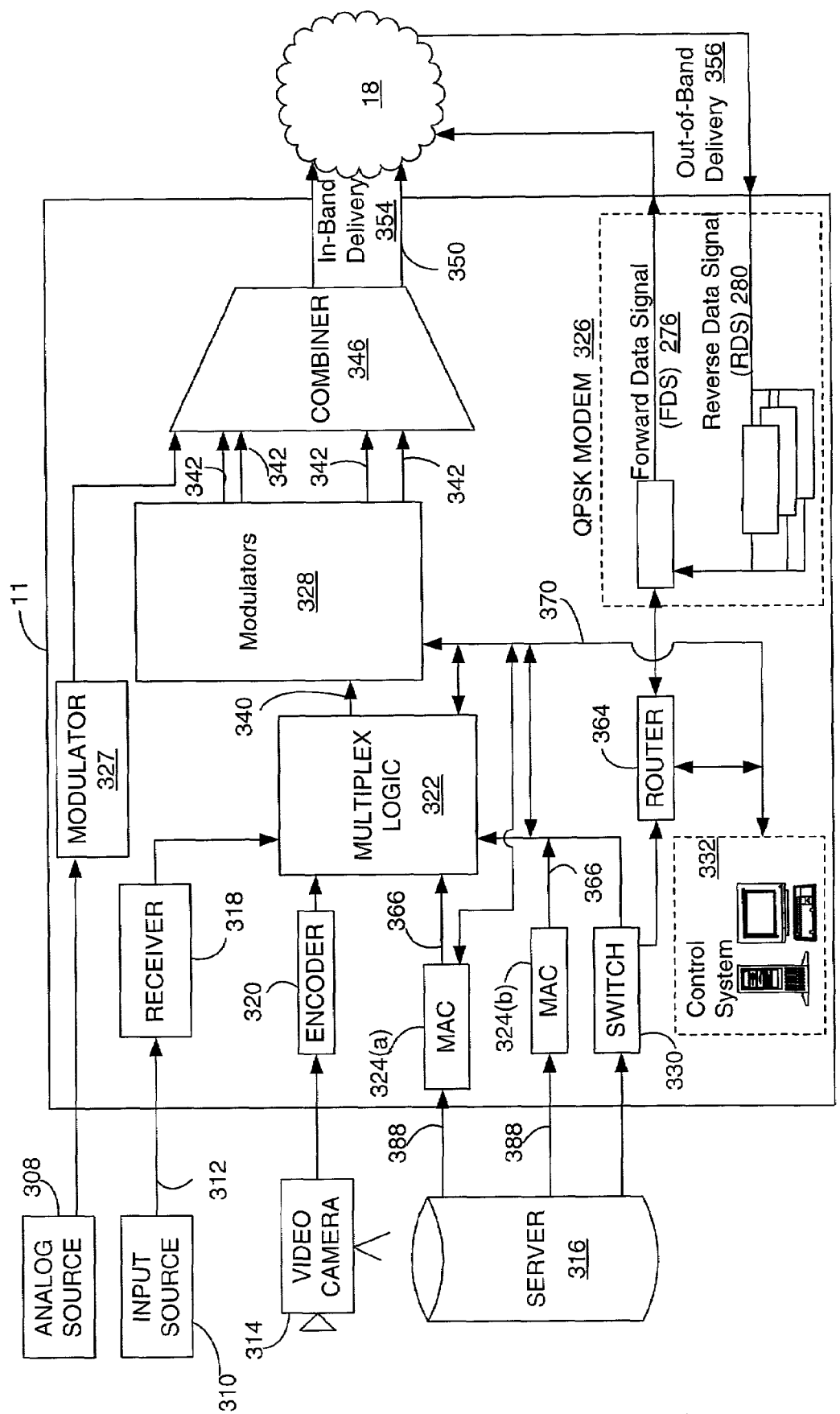
FIG. 3 is a block diagram of an example headend as depicted in FIG. 1 and related equipment, in accordance with one embodiment of the invention.

FIG. 3 is an overview of one example headend 11, which provides the interface between the STS 10 (FIG. 1) and the service and content providers. The overview of FIG. 3 is equally applicable to one example hub 12, and the same elements and principles may be implemented at a hub 12 instead of the headend 11 as described herein. It will be understood that the headend 11 shown in FIG. 3 is merely illustrative and should not be construed as implying any limitations upon the scope of the preferred embodiments of the invention. The headend 11 receives media content from a variety of service and content providers, which can provide input in a variety of ways. The headend 11 combines the media content from the various sources and distributes the media content to subscribers via the distribution systems of the network 18.

In a typical system, the programming, services and other information from content providers can be distributed according to a variety of mechanisms. The input signals may be transmitted from sources to the headend 11 via a variety of transmission paths, including satellites (not shown), and terrestrial broadcast transmitters and antennas (not shown). The headend 11 can also receive media content from a direct feed source 310 via a direct line 312. Other input sources from content providers include a video camera 214, analog input source 308, or an application server 316. The application server 316 may include more than one line of communication. One or more components such as analog input source 308, input source 310, video camera 314, and application server 316 can be located external to the headend 11, as shown, or internal to the headend 11 as would be appreciated by one having ordinary skill in the art. The signals provided by the content or programming input sources can include a single media content instance or a multiplex that includes several media content instances.

The headend 11 generally includes one or more receivers 318 that are each associated with a content source. MPEG encoders, such as encoder 320, are included for digitally encoding local programming or a real-time feed from video camera 314, or the like. The encoder 320 outputs the respective compressed video and audio streams corresponding to the analog audio/video signal received at its input. For example, encoder 320 can output formatted MPEG-2 or MPEG-1 packetized elementary (PES) streams or transport streams compliant to the syntax and semantics of the ISO MPEG-2 standard, respectively. The PES or transport streams may be multiplexed with input signals from the switch 330, the receiver 318 and the control system 332. The multiplexing logic 322 processes the input signals and multiplexes at least a portion of the input signals into the transport stream 340. The analog input source 308 can provide an analog audio/video broadcast signal that can be input into a modulator 327. From the modulator 327, a modulated analog output signal can be combined at a combiner 346 along with other modulated signals for transmission into a transmission medium 350. Alternatively, the analog audio/video broadcast signal from the analog input source 208 can be input into modulator 328. Alternatively, the analog audio/video broadcast signal can be input directly from the modulator 327 to the transmission medium 350. The analog broadcast media content instances are transmitted via respective RF channels, each assigned for transmission of an analog audio/video signal such as National Television Standards Committee (NTSC) video, as described in association with FIG. 2.

The switch, such as an asynchronous transfer mode (ATM) switch 330, provides an interface to an application server 316. There can be multiple application servers 316 providing a variety of services such as a Pay-Per-View service, including video on demand (VOD), a data service, an Internet service, a network system, or a telephone system. Service and content providers may download media content to an application server located within the STS 10 (FIG. 1). The application server 316 may be located within the headend 11 or elsewhere within the STS 10, such as in a hub 12 (FIG. 1). The various inputs into the headend 11 are then combined with the other information from the control system 332, which is specific to the STS 10, such as local programming and control information, which can include, among other things, conditional access information. The headend 11 contains one or more modulators 328 to convert the received transport streams 340 into modulated output signals suitable for transmission over the transmission medium 350 through the network 18. Each modulator 328 may be a multimodulator including a plurality of modulators, such as, but not limited to, QAM modulators, that radio frequency modulate at least a portion of the transport streams 340 to become output transport streams 342. The output signals 342 from the various modulators 328 or multimodulators are combined, using equipment such as the combiner 346, for input into the transmission medium 350, which is sent via the in-band delivery path 354 to subscriber locations (not shown). The in-band delivery path 354 can include the DTSs 264, 268, 272, and the ATS 260, as described with FIG. 2.

In one embodiment, the server 316 also provides various types of data 388 to the headend 11. The data, in part, is received by the media access control functions 324 that output MPEG transport packets containing data 366 instead of digital audio/video MPEG streams. The control system 332 enables the television system operator to control and monitor the functions and performance of the STS 10. The control system 332 interfaces with various components, via a communication link 370, in order to monitor and/or control a variety of functions, including the frequency spectrum lineup of the programming for the STS 10, billing for each subscriber, and conditional access for the media content distributed to subscribers. Information, such as conditional access information, is communicated from the control system 332 to the multiplexing logic 322 where it is multiplexed into a transport stream 340.

Among other things, the control system 332 provides input to the modulator 328 for setting the operating parameters, such as selecting certain media content instances or portions of transport streams for inclusion in one or more output transport streams 342, system specific MPEG table packet organization, and/or conditional access information. Control information and other data can be communicated to hubs 12 (FIG. 1) and DHCTs 16 (FIG. 1) via an in-band delivery path 354 or via an out-of-band delivery path 356.

The out-of-band data is transmitted via the out-of-band FDS 276 of transmission medium 350 by means such as, but not limited to, a QPSK modem array 326. Two-way communication utilizes the RDS 280 of the out-of-band delivery path 356. The hubs 12 (FIG. 1) and DHCTs 16 (FIG. 1) transmit out-of-band data through the transmission medium 350, and the out-of-band data is received in the headend 11 via the out-of-band RDS 280. The out-of-band data is routed through a router 364 to an application server 316 or to control system 332. The out-of-band control information includes such information as, among many others, a pay-per-view purchase instruction and a pause viewing command from the subscriber location to a video-on-demand type application server located internally or external to the headend 11, such as the application server 316, as well as any other data sent from the DHCT 16 or hubs 12, all of which will preferably be properly timed. The control system 332 also monitors, controls, and coordinates all communications in the subscriber television system, including video, audio, and data. The control system 332 can be located at the headend 11 or remotely. The transmission medium 350 distributes signals from the headend 11 to the other elements in the subscriber television system, such as a hub 12, a node 13, and subscriber locations (FIG. 1). The transmission medium 350 can incorporate one or more of a variety of media, including, for example, optical fiber, coaxial cable, and HFC, satellite, direct broadcast, or other transmission media.

Figure 4:
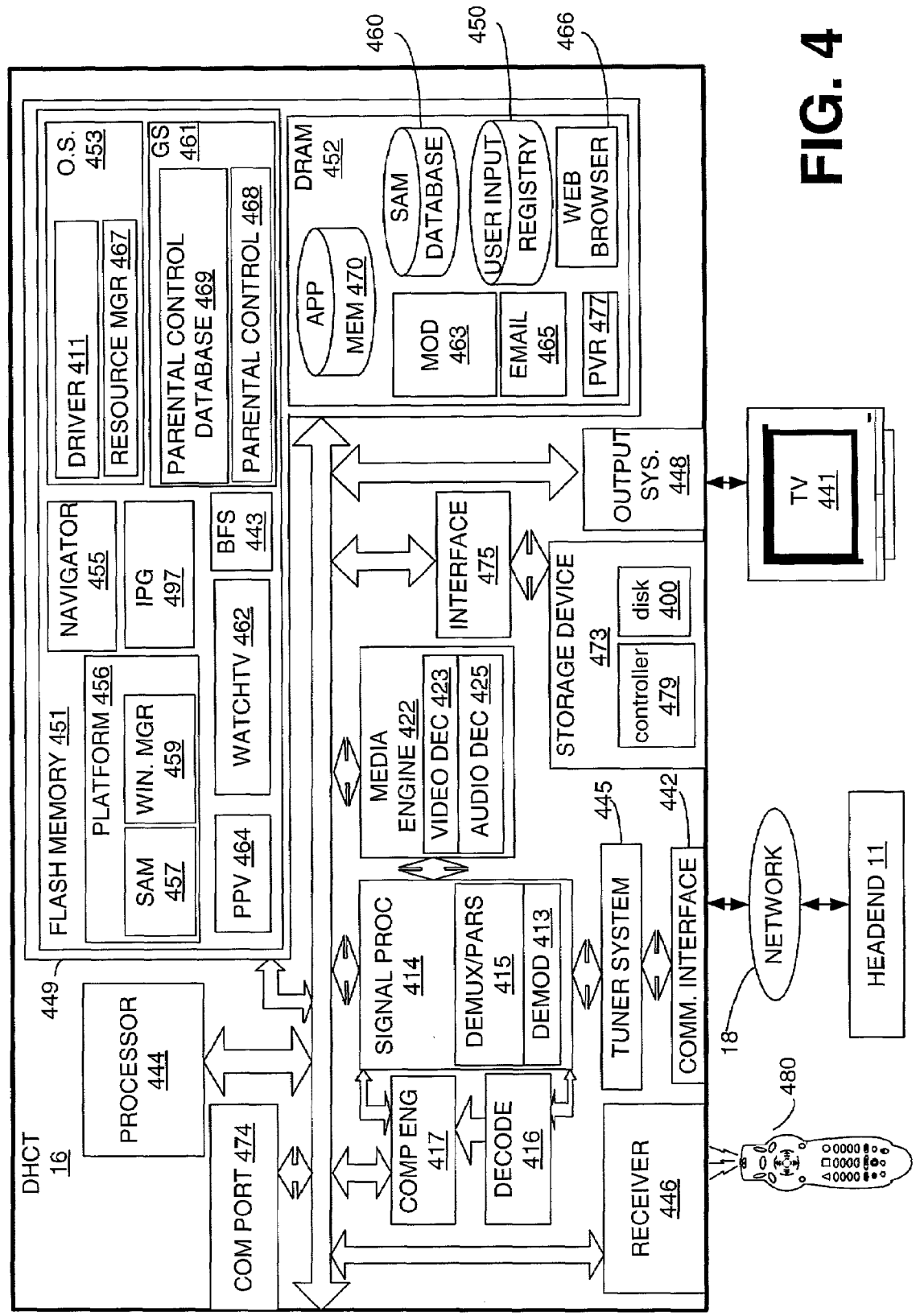
FIG. 4 is a block diagram of an example DHCT as depicted in FIG. 1 and related equipment, in accordance with one embodiment of the invention.

FIG. 4 is a block diagram illustration of an example DHCT 16 that is coupled to a headend 11 and to a television 441, in accordance with one embodiment of the invention. It will be understood that the DHCT 16 shown in FIG. 4 is merely illustrative and should not be construed as implying any limitations upon the scope of the preferred embodiments of the invention. For example, some of the functionality performed by applications executed in the DHCT 16 (such as an MOD application 463) may instead be performed completely or in part at the headend 11 and vice versa, or not at all in some embodiments. A DHCT 16 is typically situated at the residence or place of business of a user and may be a stand-alone unit or integrated into another device such as, for example, a television set or a personal computer or other display devices or an audio device. The DHCT 16 preferably includes a communications interface 442 for receiving signals (video, audio and/or other data) from the headend 11 through the network 18 and for providing any reverse information to the headend 11 through the network 18.

The DHCT 16 further preferably includes one or more processors, such as processor 444, for controlling operations of the DHCT 16, an output system 448 for driving the television display 441, and at least one tuner system 445 for tuning into a particular television channel or frequency to display media content and for sending and receiving various types of data or media content to and from the headend 11. The DHCT 16 may include, in other embodiments, multiple tuners for receiving downloaded (or transmitted) media content. The tuner system 445 can select from a plurality of transmission signals (FIG. 2) provided by the subscriber television system. The tuner system 445 enables the DHCT 16 to tune to downstream media and data transmissions, thereby allowing a user to receive digital or analog media content delivered in the downstream transmission via the subscriber television system. The tuner system 445 includes, in one implementation, an out-of-band tuner for bi-directional QPSK data communication and one or more QAM tuners (in band) for receiving television signals. Additionally, a receiver 446 receives externally generated information, such as user inputs or commands from an input device, such as remote control device 480, or other devices.

According to another embodiment of the invention, a telephone modem (not shown) in the DHCT 16 can be utilized for upstream data transmission and a headend 11, hub 12 (FIG. 1) or other component located upstream in the STS 10 (FIG. 1) can receive data from a telephone network corresponding with the telephone modem and can route the upstream data to a destination internal or external to the STS 10, such as an application data server in the headend 11 or content provider.

The DHCT 16 includes a signal processing system 414, which comprises a demodulating system 413 and a transport demultiplexing and parsing system 415 (herein demultiplexing system) to process broadcast media content and/or data. One or more of the systems of the signal processing system 414 can be implemented with software, a combination of software and hardware, or preferably in hardware. The demodulating system 413 preferably comprises functionality for RF signal demodulation, either an analog transmission signal or a digital transmission signal. For instance, the demodulating system 413 can demodulate a digital transmission signal in a carrier frequency that was modulated, for example, as a QAM-modulated signal.

When tuned to a carrier frequency corresponding to an analog TV signal transmission, the demultiplexing system 415 is bypassed and the demodulated analog TV signal that is output by the demodulating system 413 is instead routed to an analog video decoder 416. The analog video decoder 416 converts the analog video signal (i.e., the video portion of a media content instance that comprises a video portion and an audio portion) received at its input into a respective non-compressed digital representation comprising a sequence of digitized pictures and their respective digitized audio. Presented at the input to the analog video decoder 416 is an analog video signal such as NTSC video comprising of audio and video. In one implementation, the video consists of a sequence of fields spaced apart at approximately one-sixtieth of a second. A pair of consecutive fields constitutes a picture. The odd field contains the odd-numbered lines of the picture and the even field contains the even-numbered lines of the picture. The analog video decoder 416 outputs the corresponding sequence of digitized pictures and respective digitized audio. Each picture is a two dimensional entity of picture elements and each picture element contains a respective set of values. A picture element value comprises luminance and chrominance information that are representative of brightness and color information at the spatial location of the picture element within the picture.

Digitized pictures and respective audio output by the analog video decoder 416 are presented at the input of a compression engine 417. Digitized pictures and respective audio output by analog video decoder 416 can also be presented to an input of a media engine 422 via an interface (not shown) dedicated for non-compressed digitized analog video and audio, such as ITU-656 (International Telecommunications Union or ITU), for display on the TV 441. The compression engine 417 is coupled to localized, dedicated memory 449, preferably DRAM (not shown), for input and processing of the input digitized pictures and their respective digitized audio. Alternatively, the compression engine 417 can have its own integrated memory (not shown). The compression engine 417 processes the sequence of digitized pictures and digitized audio and converts them into a video compressed stream and an audio compressed stream, respectively. The compressed audio and video streams are produced in accordance with the syntax and semantics of a designated audio and video coding method, such as specified by the MPEG-2 audio and MPEG-2 video ISO (International Organization for Standardization or ISO) standard, so that they can be interpreted by a video decoder (video decompression engine) 423 and audio decoder (audio decompression engine) 425 for decompression and reconstruction at a future time. Each compressed stream consists of a sequence of data packets containing a header and a payload. Each header contains a unique program identification, or PID, associated with the respective compressed stream.

The compression engine 417 multiplexes the audio and video compressed streams into a transport stream, such as an MPEG-2 transport stream, for output. Furthermore, the compression engine 417 can compress audio and video corresponding to more than one media content instance in parallel (e.g., from two tuned analog TV signals) and to multiplex the respective audio and video compressed streams into a single transport stream. Output of compressed streams and/or transport streams produced by the compression engine 417 is input to the signal processing system 414. Parsing capabilities 415 within the signal processing system 414 allow for interpretation of sequence and picture headers, for instance, annotating their locations within their respective compressed stream for future retrieval from a storage device 473. A compressed analog media content instance (e.g., TV program episode or show) corresponding to a tuned analog transmission channel can be output as a transport stream by the signal processing system 414 and presented as input for storage in the storage device 473 via an interface 475 as will be described below. The packetized compressed streams can be also output by the signal processing system 414 and presented as input to the media engine 422 for decompression by the video decompression engine 423 and the audio decompression engine 425 for its display on TV 441, as will be described below.

The demultiplexing system 415 can include MPEG-2 transport demultiplexing. When tuned to carrier frequencies carrying a digital transmission signal, the demultiplexing system 415 enables the separation of packets of data, corresponding to the compressed streams of information belonging to the desired media content instances, for further processing. Concurrently, the demultiplexing system 415 precludes packets in the multiplexed transport stream that are irrelevant or not desired, such as packets of data corresponding to compressed streams of media content instances of other media content signal sources (e.g., other TV channels), from further processing.

The parsing capabilities of the demultiplexing system 415 includes reading and interpreting the received transport stream without disturbing its content, such as to interpret sequence and picture headers, for instance, to annotate their locations within their respective compressed stream for future retrieval from the storage device 473. Thus, the components of the signal processing system 414 are capable of QAM demodulation, forward error correction, and demultiplexing MPEG-2 transport streams, and parsing elementary streams and packetized elementary streams. A compressed media content instance corresponding to a tuned carrier frequency carrying a digital transmission signal can be output as a transport stream by the signal processing system 414 and presented as input for storage in the storage device 473 via the interface 475 as will be described below. The packetized compressed streams can be also output by the signal processing system 414 and presented as input to the media engine 422 for decompression by the video decompression engine 423 and the audio decompression engine 425 as will be described below.

One having ordinary skill in the art will appreciate that the signal processing system 414 will preferably include other components not shown, including memory, decryptors, samplers, digitizers (e.g., analog-to-digital converters), and multiplexers, among other components. Further, other embodiments will be understood, by those having ordinary skill in the art, to be within the scope of the preferred embodiments of the present invention, including analog signals (e.g., NTSC) that bypass one or more elements of the signal processing system 414 and are forwarded directly to the output system 448. Further, outputs presented at corresponding next-stage inputs for the aforementioned signal processing flow may be connected via accessible memory 449 in which the outputting device stores the output data and the inputting device thereafter inputs the output data written to memory 449 by the respective outputting device. Outputting and inputting devices include the analog video decoder 416, the compression engine 417, the media engine 422, the signal processing system 414, and components or subcomponents thereof. Further, it will be understood by those having ordinary skill in the art that components of the signal processing system 414 can be spatially located in different areas of the DHCT 16. Further, it will be understood by those having ordinary skill in the art that, although the components of the signal processing system 414 are illustrated as being in communication with an incoming signal from the communications interface 442, the signal may not necessarily be in the order shown for all signals.

The DHCT 16 also includes the media engine 422, which includes the digital video decoder 423 (also known as video decompression engine), and the digital audio decoder 425 (also known as audio decompression engine), and other digital signal processing components not shown, as would be appreciated by those having ordinary skill in the art. For example, the demultiplexing system 415 is in communication with the tuner system 445 and the processor 444 to effect reception of digital compressed video streams, digital compressed audio streams, and data streams corresponding to one or more media content instances to be separated from other media content instances and/or streams transported in the tuned transmission channel and to be stored in a first part (not shown) of DRAM 452 of DHCT 16 assigned to receive packets of a first or second media content instance. Other dedicated memory may also be used for media content instance packets.

Furthermore, while conducting this process, the demultiplexing system 415 demultiplexes and separates desired compressed streams from the received transport stream without disturbing its content. Further, the parser 415 parses (i.e., reads and interprets) compressed streams such as to interpret sequence headers and picture headers, and deposits a transport stream carrying compressed streams of a media content instance into DRAM 452. The processor 444 causes the transport stream in DRAM 452 to be transferred to the storage device 473 via the interface 475. Under program control by the processor 444, the demultiplexing system 415 in communication with the digital video decoder 423, the storage device 473, and the processor 444 effect notification and/or transfer of received packets of one or more compressed streams corresponding to one or more media content instances from a first part of DRAM 452 to a second part (not shown) of DRAM 452 assigned to the digital video decoder 423 and the digital audio decoder 425. Alternatively, the media engine 422 can have access to a dedicated localized DRAM (not shown). Upon demultiplexing and parsing the transport stream carrying one or more media content instances, the signal processing system 414 outputs to DRAM 452 ancillary data in the form of a table or data structure (not shown) comprising the relative or absolute location of the beginning of certain pictures in the compressed media content instance for convenience in retrieval during future operations.

In another embodiment, according to a plurality of tuners, and respective number of demodulating systems 413, demultiplexing systems 415, and signal processing systems 414, a respective number of broadcast digital media content instances are received and routed to the hard disk 400 of the storage device 473 simultaneously. Alternatively, a single demodulating system 413, a single demultiplexing system 415, and a single signal processing system 414, each with sufficient processing capabilities can serve to process more than one digital media content instance.

In another embodiment according to the aforementioned description, a first tuner of the tuning system 445 receives an analog video signal corresponding to a first media content instance and a second tuner receives a digital compressed stream corresponding to a second media content instance. The first media content instance is processed as an analog signal and the second media content instance is processed as a digital compressed stream as described above.

In one implementation, the compression engine 417 can output formatted MPEG-2 or MPEG-1 packetized elementary streams (PES) inside a transport stream, all compliant to the syntax and semantics of the ISO MPEG-2 standard. Alternatively, the compression engine 417 can output other digital formats that are compliant to other standards. The digital compressed streams output by the compression engine 417 corresponding to a media content instance are deposited in local memory for the compression engine 417 and routed to the demultiplexing system 415. The demultiplexing system 415 parses (i.e., reads and interprets) the transport stream generated by the compression engine 417 without disturbing its content, such as to interpret picture headers, and deposits the transport stream into DRAM 452. The processor 444 causes the transport stream in DRAM 452 to be transferred to the storage device 473. While parsing the transport stream, the demultiplexing system 415 outputs to memory 452 ancillary data in the form of a table or data structure (not shown) comprising the relative or absolute location of the beginning of certain pictures in the compressed media content stream for the media content instance for convenience in retrieval during future operations. In this way, random access operations such as fast forward, rewind, and jumping to a location in the compressed media content instance can be attained.

In another embodiment, according to a plurality of tuners, a respective number of analog video decoders 416, and a respective number of compression engines 417, the aforementioned compression of analog video and audio is performed and routed to the hard disk 400 of the storage device 473 simultaneously on a respective number of analog media content instances. Alternatively, a single compression engine with sufficient processing capabilities can serve to compress more than one analog media content instance.

One or more programmed software applications are executed by utilizing the computing resources in the DHCT 16. Note that an application typically includes a client part and a server counterpart that cooperate to provide the complete functionality of the application. The applications may be resident in FLASH memory 451 or downloaded (or uploaded) into DRAM 452. Applications stored in FLASH memory 451 or DRAM 452 are executed by the processor 444 (e.g., a central processing unit or digital signal processor) under the auspices of the operating system 453. Data required as input by an application is stored in DRAM 452 or FLASH memory 451 and read by the processor 444 as need be during the course of application execution. Input data may be data stored in DRAM 452 by a secondary application or other source, either internal or external to the DHCT 16, or possibly anticipated by the application and thus created with the application at the time it was generated as a software application, in which case it is stored in FLASH memory 451. Data generated by an application is stored in DRAM 452 by the processor 444 during the course of application execution. DRAM 452 also includes application memory 470 that various applications may use for storing and/or retrieving data.

An application referred to as a navigator 455 is also resident in FLASH memory 451 for providing a navigation framework for services provided by the DHCT 16. The navigator 455 registers for and in some cases reserves certain user inputs related to navigational keys such as channel increment/decrement, last channel, favorite channel, etc. The navigator 455 also provides users with television related menu options that correspond to DHCT functions such as, for example, blocking a channel or a group of channels from being displayed in a channel menu presented on a screen display.

The FLASH memory 451 also contains a platform library 456. The platform library 456 is a collection of utilities useful to applications, such as a timer manager, a compression manager, a configuration manager, a hyper text markup language (HTML) parser, a database manager, a widget toolkit, a string manager, and other utilities (not shown). These utilities are accessed by applications via application programming interfaces (APIs) as necessary so that each application does not have to contain these utilities. Two components of the platform library 456 that are shown in FIG. 4 are a window manager 459 and a service application manager (SAM) client 457.

The window manager 459 provides a mechanism for implementing the sharing of the screen regions and user input. The window manager 459 on the DHCT 16 is responsible for, as directed by one or more applications, implementing the creation, display, and de-allocation of the limited DHCT 16 screen resources. It allows multiple applications to share the screen by assigning ownership of screen regions, or windows. The window manager 459 also maintains, among other things, a user input registry 450 in DRAM 452 so that when a user enters a key or a command via the remote control device 480 or another input device such as a keyboard or mouse, the user input registry 450 is accessed to determine which of various applications running on the DHCT 16 should receive data corresponding to the input key and in which order. As an application is executed, it registers a request to receive certain user input keys or commands. When the user presses a key corresponding to one of the commands on the remote control device 480, the command is received by the receiver 446 and relayed to the processor 444. The processor 444 dispatches the event to the operating system 453 where it is forwarded to the window manager 459 which ultimately accesses the user input registry 450 and routes data corresponding to the incoming command to the appropriate application.

The SAM client 457 is a client component of a client-server pair of components, with the server component (not shown) being located on the headend 11, preferably in the control system 332 (FIG. 3). A SAM database 460 (i.e., structured data such as a database or data structure) in DRAM 452 includes a data structure of services and a data structure of channels that are created and updated by the headend 11. Herein, database will refer to a database, structured data or other data structures as is well known to those of ordinary skill in the art. Many services can be defined using the same application component, with different parameters. Examples of services include, without limitation and in accordance with one implementation, presenting television instances (available through a WatchTV application 462), pay-per-view events (available through a PPV application 464), digital music (not shown), media-on-demand (available through an MOD application 463), and an interactive program guide (IPG) 497. In general, the identification of a service includes the identification of an executable application that provides the service along with a set of application-dependent parameters that indicate to the application the service to be provided. As an example, a service of presenting a television instance (media content instance) could be executed by the WatchTV application 462 with a set of parameters specifying the HBO to view HBO or with a separate set of parameters to view CNN. Each association of the application component (tune video) and one parameter component (HBO or CNN) represents a particular service that has a unique service I.D. The SAM client 457 also interfaces with the resource manager 467 to control resources of the DHCT 16.

Applications can also be downloaded into DRAM 452 at the request of the SAM client 457, typically in response to a request by the user or in response to a message from the headend 11. In the example DHCT 16 illustrated in FIG. 4, DRAM 452 includes a media-on-demand (MOD) application 463, an e-mail application 465, PVR application 477, and a web browser application 466. It should be clear to one with ordinary skill in the art that these applications are not limiting and merely serve as examples for embodiments of the invention. Furthermore, one or more DRAM based applications may be resident, as an alternative embodiment, in FLASH memory 451. These applications, and others provided by the subscriber television system operator, are top-level software entities on the network for providing services to the user.

In one implementation, applications executing on the DHCT 16 work with the navigator 455 by abiding by several guidelines. First, an application utilizes the SAM client 457 for the provision, activation, and suspension of services. Second, an application shares DHCT 16 resources with other applications and abides by the resource management policies of the SAM client 457, the operating system 453, and the DHCT 16. Third, an application handles situations where resources are only available with navigator 455 intervention. Fourth, when an application loses service authorization while providing a service, the application suspends the service via the SAM (the navigator 455 will reactivate an individual service application when it later becomes authorized). Finally, an application is designed to not have access to certain user input keys reserved by the navigator (i.e., power, channel +/−, volume +/−, etc.).

The MOD application 463 provides the user with lists of available media content titles for each media content instance to choose from and with media content instances requested by the user. The MOD application 463 provides media content to the user by engaging, typically, in a direct two-way IP (Internet Protocol) connection with VOD content servers (not shown) that would be located, in one embodiment, in the headend 11.

An executable program or algorithm corresponding to an operating system (OS) component, or to a client platform component, or to an application, or to respective parts thereof, can reside in and execute out of DRAM 452 and/or FLASH memory 451. Likewise, data input into or output from any executable program can reside in DRAM 452 or FLASH memory 451. Furthermore, an executable program or algorithm corresponding to an operating system component, or to a client platform component, or to an application, or to respective parts thereof, can reside in FLASH memory 451, or in a local storage device (such as storage device 473) externally connected to or integrated into the DHCT 16 and be transferred into DRAM 452 for execution. Likewise, data input for an executable program can reside in FLASH memory 451 or a storage device and be transferred into DRAM 452 for use by an executable program or algorithm. In addition, data output by an executable program can be written into DRAM 452 by an executable program or algorithm and be transferred into FLASH memory 451 or into a storage device. In other embodiments, the executable code is not transferred, but instead, functionality is effected by other mechanisms.

The DHCT 16 can also include one or more wireless or wired interfaces, also called communication ports 474, for receiving and/or transmitting data to other devices. For instance, the DHCT 16 may feature USB (Universal Serial Bus), Ethernet (for connection to a computer), IEEE-1394 (for connection to media content devices in an entertainment center), serial, and/or parallel ports. The user inputs may be, for example, provided by an input device including a computer or transmitter with buttons or keys located either on the exterior of the terminal or by a hand-held remote control device 480 or keyboard that includes user-actuated buttons, or even aural input (e.g., voice activated).

The DHCT 16 includes at least one storage device 473 to provide storage for downloaded media content. The storage device 473 can be an optical storage device or a magnetic storage device, among others, and is preferably a hard disk drive. The storage device 473 comprises storage for media content and/or data that can be written to for storage and later read from for retrieval for presentation. The storage device 473 preferably includes at least one hard disk 400. Throughout this disclosure, references relating to writing to or reading from the storage device 473, or references regarding recordings from or to the storage device 473 will be understood to mean that such read or write operations are occurring to the actual medium (for example, the hard disk 400) of the storage device 473. The storage device 473 is also comprised of a controller 479 that receives operating instructions from the device driver 411 of the operating system 453 (as described below) and implements those instructions to cause read and/or write operations to the hard disk 400.

Referring again to FIG. 4, the storage device 473 is preferably internal to the DHCT 16, coupled to a common bus through a communication interface 475, preferably an integrated drive electronics (IDE) interface or small computer system interface (SCSI), although IEEE-1394 or USB can be used. In other embodiments, the storage device 473 can be externally connected to (and thus removable from) the DHCT 16 via a communication port 474 implemented as IEEE-1394 or USB or as a data interface port such as a SCSI or an IDE interface. In one implementation, under the auspices of the real-time operating system 453 (as described below) and executed by the processor 444, and in coordination with the personal video recording (PVR) application 477, the device driver 411, and the device controller 479 (the latter three components described below), downloaded media content (herein understood to also refer to other types of data, in addition to, or instead of, media content instances) are received in the DHCT 16 via the communications interface 442, processed as described above, and stored in a temporary cache (not shown) in memory 449. The temporary cache is implemented and managed to enable media content transfers from the temporary cache to the storage device 473, or, in concert with the insertion of a newly arriving media content into the temporary cache.

In one implementation, the fast access time and high data transfer rate characteristics of the storage device 473 enables media content to be read from the temporary cache in memory 449 and written to the storage device 473 in a sufficiently fast manner. Orchestration of multiple simultaneous data transfer operations is effected so that while media content is being transferred from the cache in memory 449 to the storage device 473, new media content is received and stored in the temporary cache of memory 449. In other implementations, the downloaded media content is received through the communications port 474 in the DHCT 16 and then transferred directly to the storage device 473, thus bypassing the temporary cache. Writes to the hard disk are coordinated between the PVR application 477 (described below), the operating system 453, the device driver 411, and the storage device controller 479.

The processor 444 in communication generally with the device driver 411 and the storage device controller 479 and the demultiplexing system 415 effect retrieval of compressed video streams, compressed audio streams, and data streams corresponding to one or more media content instances from the storage device 473. Retrieved streams are deposited in an output cache in the storage device 473 and transferred to DRAM 452, and then processed for playback according to mechanisms well known to those having ordinary skill in the art. In some embodiments, one or more media content instances are retrieved and routed from the hard disk 400 to the video and audio decoding system 423 and 425 simultaneously, and then further processed for eventual presentation on a display device or other device.

The PVR application 477 provides for media content recording functionality by enabling the temporary writing to, and if requested, more permanent recording (i.e., relatively permanent) to the storage device 473. Media content can be transmitted (or downloaded) from a remote location, such as, for example, a remote server located in the headend 11, or from a home communication network, or from other consumer electronic devices. The downloaded media content that is received at each tuner of the tuner system 445 is temporarily buffered, or stored, on the hard disk 400 of the storage device 473.

The general settings application 461 provides for operating system-like functionality to aid the user in navigating through the various user interface screens as well as provide background functionality for the various applications. Although shown as a separate application in FLASH memory 451, in some embodiments the general settings application 461 can be integrated with the operating system 353. Further, although shown stored in FLASH memory 451, in some embodiments, all or a portion of the data for the general settings menu can be stored in the storage device 473. The general settings application 461 includes, among other modules, a parental control system 468 for authorizing, or enabling, access to defined media content, as will be described below. The parental control system 468 includes mechanisms to provide for administrator level user interface screens that can be used by an administrator to enable access to media content, as will be described below. The general settings application 461 also includes a parental control database 469 for storing personal identification numbers (PIN) of enabled authorization levels and for associating (for example via pointers to) the authorized media content with a particular PIN. In other embodiments, the parental control system 468 and/or database 469 can be maintained and implemented, at least in part, at the headend 11 (FIG. 2), or at a hub implemented as a mini-headend. In addition, the parental control system 468 and/or database 469, or its functionality, can be incorporated into many applications, and is not so limited to the general settings application described above. For example, the parental control system functionality can be implemented with the interactive program guide (IPG) application 497 and work with the content that is presented through the IPG. In other embodiments, the parental control functionality can be integrated with the middleware and/or the operating system 453 so that all of the application-clients can be "approved" through the positive parental control before some or even any part of the application is accessible to specific users.

Figure 5:
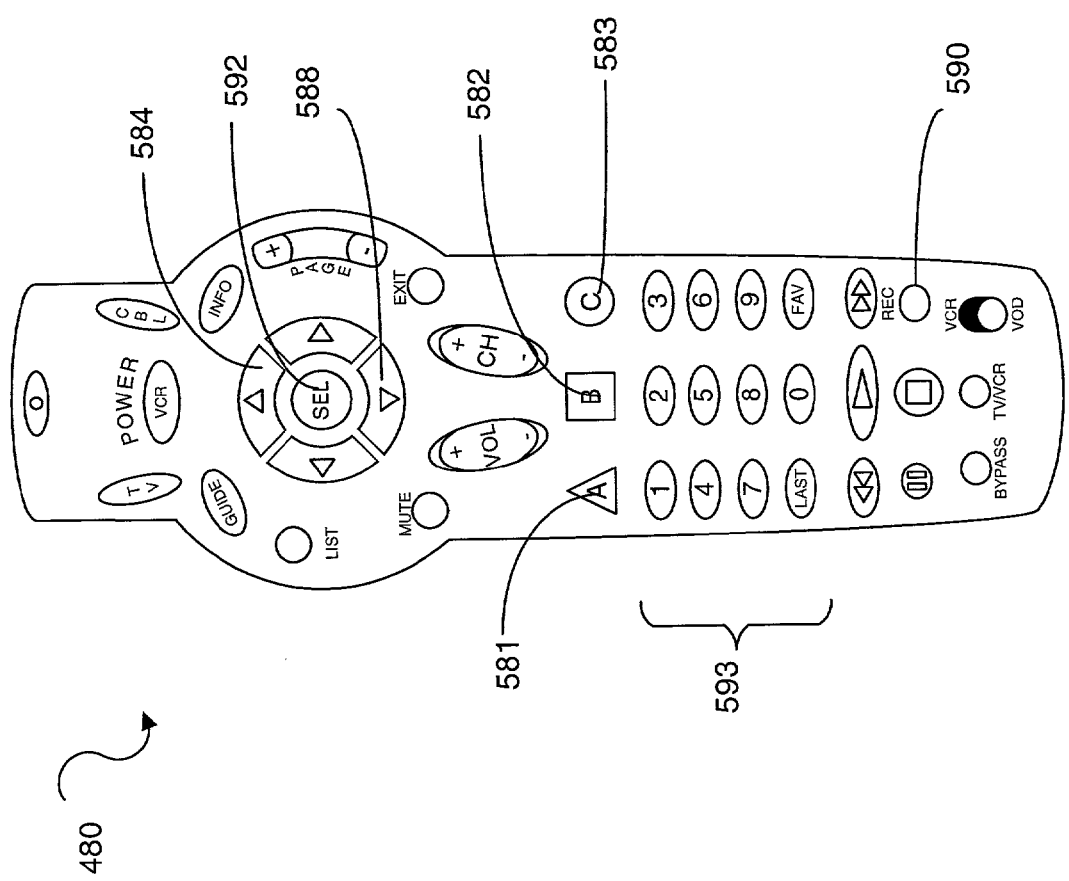
FIG. 5 is a schematic diagram of an example remote control device to provide input to the DHCT 16 illustrated in FIG. 4, in accordance with one embodiment of the invention.

A display channel is selected, and changed, by a user, typically via pressing a key or button on a remote control device, such as that depicted in FIG. 5. Record button 590 enables the user to designate as permanently recorded any media content instance received by the DHCT 16. The "A" 581, "B" 582, and "C" 583 buttons can correspond to certain application-defined functions that have a corresponding "A", "B", or "C" symbol displayed in a graphics user interface (GUI) presented on a display device. Similarly, up arrow button 584 and down arrow button 588 and select button 592 will be used to provide functionality to like-displayed symbols on a GUI. Number buttons 593 enable the user to select a display channel for viewing media content. Many alternative methods of providing user input may be used including a remote control device with different buttons and/or button layouts, a keyboard device, a voice activated device, among others. The embodiments of the invention described herein are not limited by the type of device used to provide user input.

FIGS. 6-25 will serve to illustrate the user interface aspects of positive parental control. Positive parental control will herein be understood to include the mechanisms and/or systems that enable an administrator (or a person or device in an administrator role, such as an installer at initialization, or a parent) to authorize and enable access to media content by selecting or configuring what media content a user can watch (i.e., positive parental control), as opposed to what media content a user cannot watch (typical parental control mechanisms, or exclusions). Positive parental control can be used to enable access to broadcast and on-demand media content from a subscriber television system, as well as downloaded MP3 music, CD music and/or DVD video, and other elements that can be external to, or integrated with the subscriber television system. Positive parental control can, in some embodiments, be combined with exclusions to provide a viewing and/or listening experience that presents the media content that the administrator deems suitable for access by other users. In the extreme case, if the administrator does not enable (i.e., select and/or configure) any media content for access, the users in, for instance, a household, can turn on the TV and nothing will be presented (for example, a blank screen will be shown without a message, or a blank screen will be shown with a message or a banner or similarly structured display suggesting to the user that he or she needs to contact the administrator to arrange to receive media content).

At initialization, an installer can, based on direction from the administrator, or otherwise, activate parental controls or deactivate parental controls. Should the owner decide on having parental controls, the installer can provide the administrator with a password or personal identification number (PIN) (herein, the terminology password and PIN, and the corresponding functionality, will be referred to generally with the term "PIN") that provides the administrator with access to all media content. In other embodiments, the administrator can be provided with a PIN that the administrator uses later to configure what media content the administrator will have access to, as well as what media content other users will have access to. Also at initialization, the installer and/or administrator can enable media content to be defaulted to when any user powers-on a DHCT. For example, the weather channel can be configured as default media content when a DHCT 16 (FIG. 4) is powered on (i.e., without the use of a PIN entry). In one case, should the administrator decide not to have any media content to default to, powering on the DHCT would result in a blank screen, or a screen with a message that indicates that no media content is enabled, with an additional message that instructs the user to see the administrator for further access.

Figure 6:
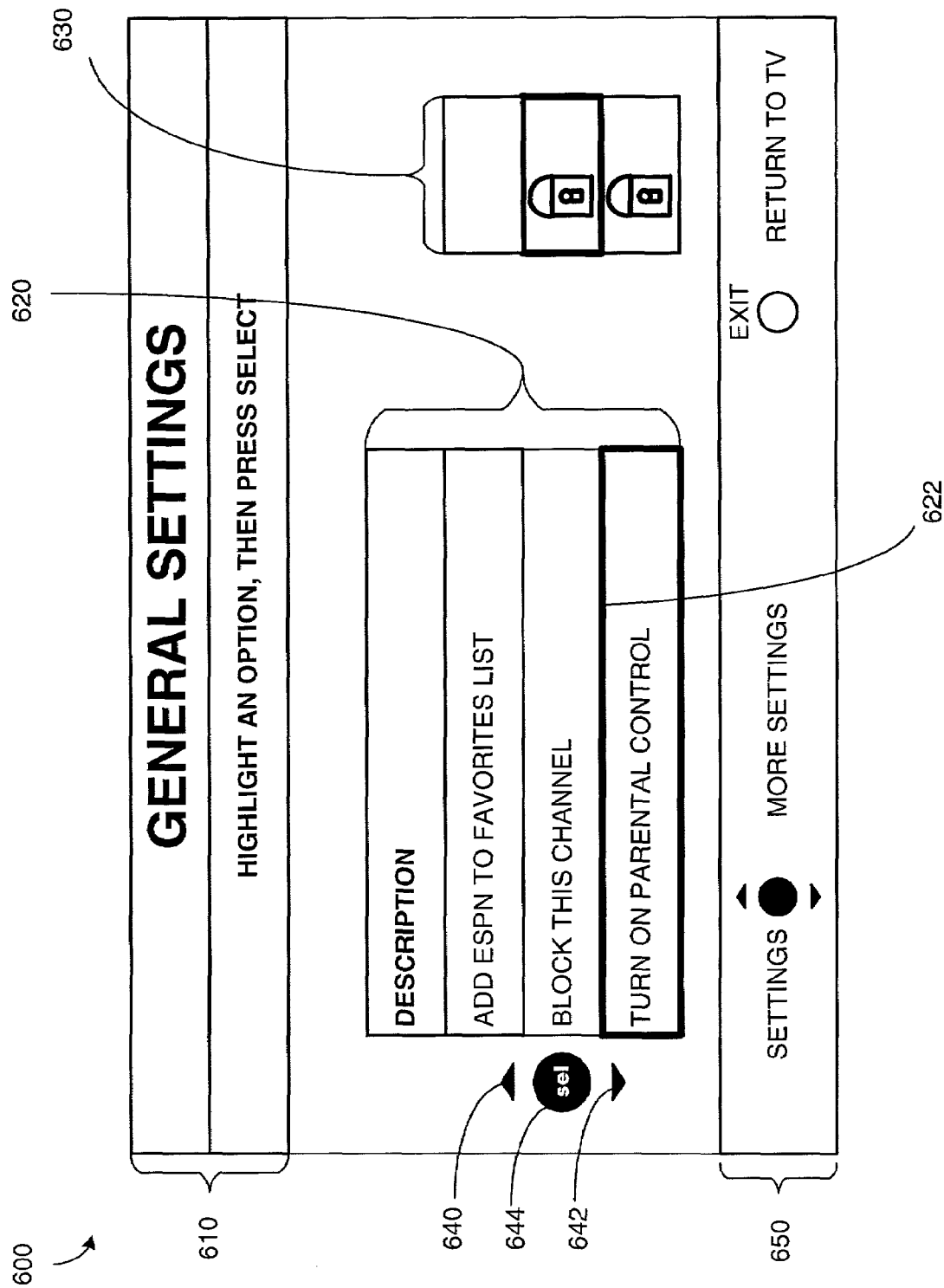
FIG. 6 is a screen diagram of an example general settings screen for accessing parental controls, in accordance with one embodiment of the invention.

FIG. 6 is a screen diagram of an example general settings screen for accessing parental controls, in accordance with one embodiment of the invention. This screen 600 can be presented to the installer upon initialization, in one implementation, or the administrator at any time, after entering the administrator PIN. In some embodiments, this screen 600 can "time-out" if left unattended for a defined period of time, thus preventing access by un-authorized users. The time-out feature can be a user-selectable feature. The general settings screen 600 includes a header 610 identifying the screen and presenting brief instructions to the administrator on how to make selections. The general settings screen 600 also includes a general settings menu 620 that provides, among other general settings options, the option to enable positive parental control, as highlighted by highlight block 622. In some embodiments, a symbol menu 630 can be presented to offer visual feedback to the user that a particular option in the general settings menu 620 has been selected, such as a lock that is open when the feature is enabled, and closed when not enabled, as an example. The user navigates between options of the general settings menu 620 preferably by using the up and down arrow buttons 584 and 588 (FIG. 5) of the remote control device 580 (FIG. 5) to move the highlight block 622, as suggested by the up and down arrow button icons 640 and 642 respectively, shown in the example general settings screen 600. Alternatively, using the remote control up and down arrow buttons 584 and 588 could move options through a stationary highlight block, or a combination of both methods could be employed.

The options, or categories, desired are selected using the select button 592 (FIG. 5) on the remote control device 580 (FIG. 5), as suggested by the select buttonicon 644 on the example screen 600. Further description herein regarding the selection of the up and down arrow button icons 640 and 642 and the select button icon 644 on the display screen will herein be understood to mean selecting the remote control buttons corresponding to those displayed button icons. In other embodiments, the administrator can move a cursor to a desired option, or the administrator can be presented with a touch screen to scroll through and select desired options, or the example screen 600 can receive aural input commands. The scope of the preferred embodiments is not limited to the manner in which the user navigates through the example screen of FIG. 6, or other screens that follow. Further, future references to selecting the button icons on the screen will be understood to mean that the user selected the displayed button icon preferably by selecting the corresponding button on the remote control device 580, with the understanding that the other mechanisms listed above, among others, for navigating on the example screen are contemplated as being within the scope of the preferred embodiments of the invention. Finally, bottom portion 650 includes instructions that suggest to the user other navigation options.

Figure 7:
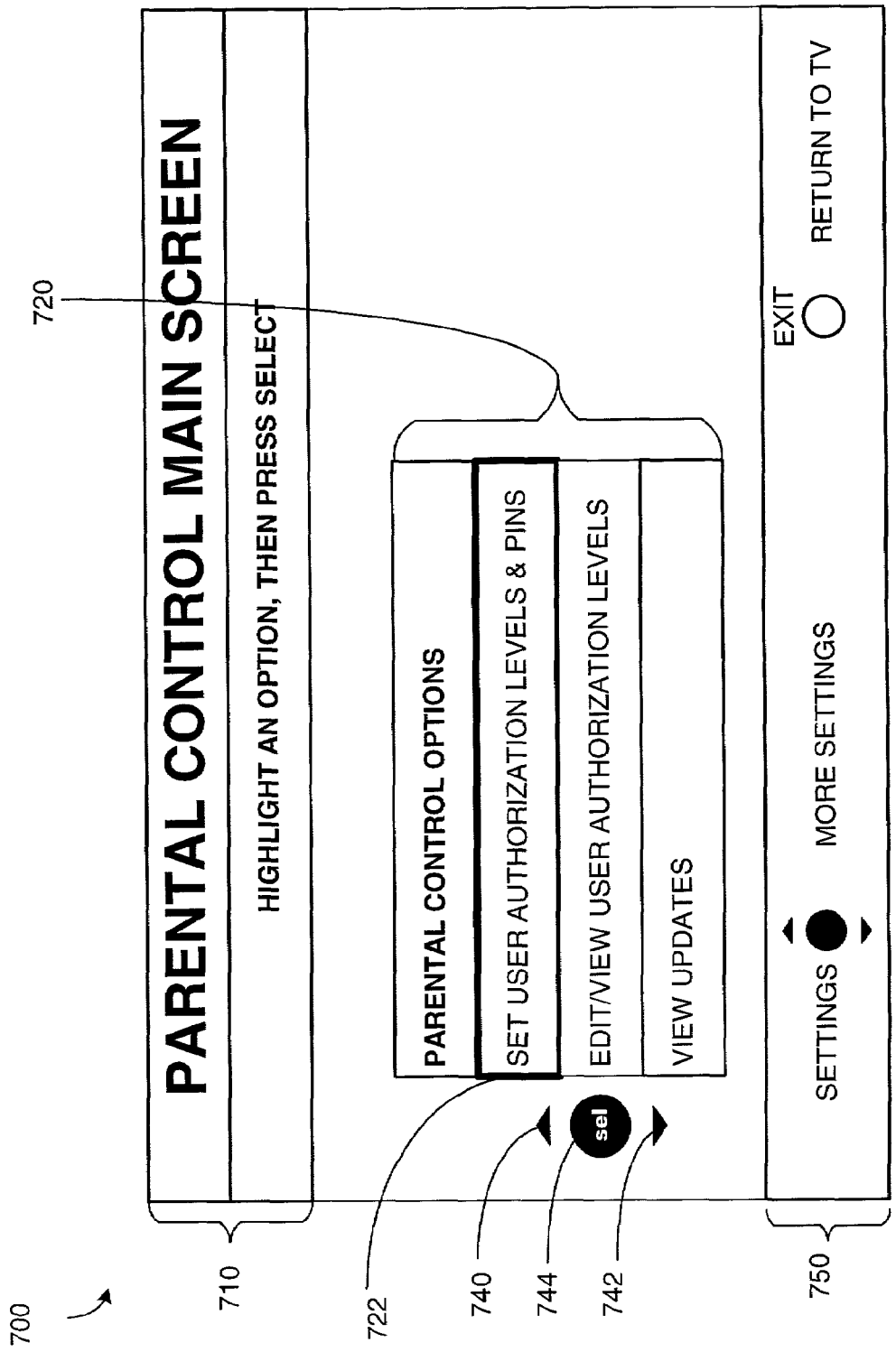
FIG. 7 is a screen diagram of an example parental control main screen, in accordance with one embodiment of the invention.

FIG. 7 is a screen diagram of an example parental control main screen, in accordance with one embodiment of the invention. The parental control main screen 700 results from the administrator selecting the "turn on parental control" option in the general settings menu 620 of example general settings screen 600 in FIG. 6. This screen 700 can also be presented upon the administrator entering a PIN from any displayed screen at any time; entered according to PIN entering mechanisms well-known to those having ordinary skill in the art. Like the general settings screen 600 (FIG. 6), the parental control main screen 700 can have, in some embodiments, a time-out feature that causes the parental control main screen 700 to stop being displayed after a defined period of time, such as when the administrator leaves the room and the screen is un-attended by the administrator for a period of time, as one example among many. The parental control main screen 700 includes a header 710 that identifies the screen and provides brief instructions to the user, a parental control options menu 720, as will be described below, up and down arrow button icons 740 and 742 and select button icon 744 for navigating the highlight block 722 to a parental control option and selecting the highlighted option. The example parental control main screen 700 also includes a bottom portion 750 for providing other navigation options.

The parental control main screen 700 includes several options in the parental control options menu 720 for enabling the administrator (or installer) to set-up and thus control the visual and/or audio experience for all of the users of a particular home, social, or business entertainment network. These options in the parental control options menu 720 include, among others, an option for the installer or the administrator to set-up the user authorization levels for a particular DHCT 16 (FIG. 4). For example, the administrator can be one or both parents of a household that includes one or more children of like-age. For this example, the administrator scrolls the highlight block 722 to the "set user authorization" option and presses the select button icon 744. The resultant screen display is shown in FIG. 8.

Figure 8:
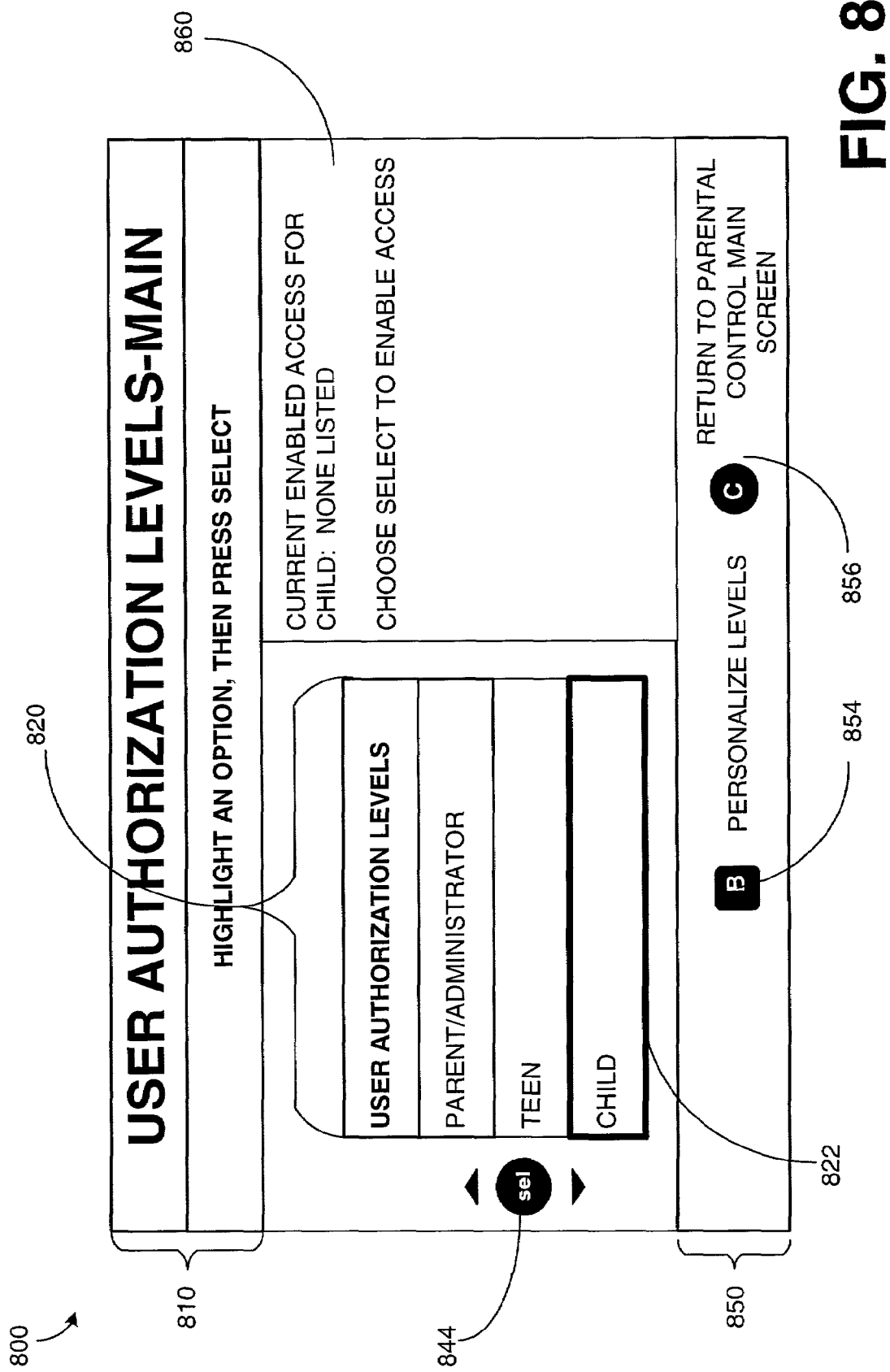
FIG. 8 is a screen diagram of an example pre-configured user authorization levels-main screen for enabling access, in accordance with one embodiment of the invention.

FIG. 8 is a screen diagram of an example pre-configured user authorization levels-main screen for enabling access, in accordance with one embodiment of the invention. The user authorization levels-main screen 800 is identified as such in the header 810. The user authorization levels menu 820 provide pre-configured authorization levels for the administrator to select, and thus enable for authorized viewing, as defined by the administrator in subsequent screens, as will be explained below. For example, by highlighting with highlight block 822 and then selecting the child authorization level option, for example, the child authorization level is enabled. Herein, enabled will be understood to mean that the authorization level (including a default or general viewing level) selected and/or configured by the administrator results in a user, categorized under this authorization level (categorized, for example, by using a PIN provided by the administrator, as described below), to be able to watch and/or hear, or generally, experience the media content selected and enabled in later screens by the administrator. The authorization levels are accessed by entering a PIN (except for the default level), as will be described below.

Highlighting one of the options in the user authorization levels menu 820, such as the child authorization level option, causes text messages in the sub-screen display 860 to confirm to the administrator the status of authorization for the highlighted authorization level. In this example, the child authorization level option, according to the text message in the subscreen display 860, has not yet been enabled. The message instructs the administrator to press the select button icon 844 to enable access for the child authorization level. Bottom portion 850 provides the administrator with the ability to personalize authorization levels using the "B" button icon 854. Although the authorization levels menu 820 is shown with three authorization levels that include parent, teen, and child, more authorization levels can be configured and/or selected and shown, such as, for example, mom, dad, child 1, child 2, teen 1, etc. In some embodiments, user authorization levels may simply be categorized into administrator and non-administrator categories. Further, the pre-configured authorization levels can be personalized through navigation to another screen by selecting the personalized authorization levels ("B") button icon 854 from the bottom portion 850, which results in a personalized authorization levels screen (not shown) that allows the administrator to enter a name for each category, according to well-known naming and identification mechanisms. Bottom portion 850 also enables the administrator to return to the parental control main screen 700 (FIG. 7) by selecting the "C" button icon 856.

Continuing with the example, assume the user chooses the select button icon 844 for the highlighted child authorization level option. This action results in the display of the enabled access main screen 900 shown in FIG. 9A. From the enabled access main screen 900, the administrator can enable the media content for the child authorization level, as well as other authorization levels. The enabled access main screen 900 includes a header 910 identifying the screen and providing instruction on how to enable access. Also included is an enable categories menu 920 that provides a list of pre-configured categories that the administrator can scroll through and choose, by category, how user access to the different types of media content will be enabled. The enable categories menu 820 can include, among other categories, display channel number, IPG select, VOD select, PPV select, WatchTV select, genre, Motion Picture Association of America (MPAA) rating, service, user-configured, and time of viewing. The administrator can choose one or more of these categories to enable viewing.

As an example of how these categories are used, consider the display channel number category. The display channel number category enables an administrator to enable user access to the media content by a particular display channel. For example, by selecting the display channel category, another screen (not shown) can be presented that lists all of the display channels available. By selecting, for example, display channel 26, the administrator is enabling the user to view all media content that is resourced from display channel 26 (in addition to any media content available for viewing as default media content selected by the administrator). Similarly, the administrator may know that the media content of interest on display channel 26 is ESPN, and thus the user can enable by selecting the WatchTV service and selecting the programming ESPN.

The categories IPG select, VOD select, PPV select, and WatchTV select provide various display screens from which the administrator can make individual media content instance selections. For example, by selecting the IPG select, the administrator can be presented with an IPG screen with parental control icons listed in each media content instance entry of the IPG screen that the administrator can configure to provide enabled viewing. The VOD, PPV, WatchTV, and IPG select option will be described below.

The genre category provides the administrator with enabled viewing selections by comedy, drama, action, and other genres. For example, by selecting comedy, all media content with meta data indicating that it includes comedy can be enabled for viewing. Various recognized rating systems can be used as categories, such as the MPAA rating system, among others. Thus, the administrator can select a rating under the MPAA system, for example, and all media content matching that rating will be enabled for viewing.

The user-configured option (not shown) enables the administrator to enter a key word, such as the title of a media content instance like an animated weekly broadcast show such as, Little Mermaid, to be enabled. In one implementation, the administrator can be presented with a screen display (not shown) that provides letters corresponding to the numbers on the remote control device 380 (FIG. 5) to enable the administrator to select a keyword of interest. In other embodiments, a media content instance title category can be pre-configured and displayed on its own screen. Further screens (not shown) can be employed to decide the source (for example, from what display channels or programming) of Little Mermaid, and whether to enable all episodes, a single episode, or episodes within a defined time zone, etc.

The time of viewing category can be employed to enable viewing by time. For example, if the 7:00 AM to 9:00 AM option included in the time of viewing category is selected, the user will be able to view only media content presented during that time period.

Sub-screen display 960 provides the PIN for the child authorization, which is preferably randomly generated after the child authorization level is enabled from the user authorization levels-main screen 800 (FIG. 8). In other embodiments, the PIN can be configured by the administrator. The sub-screen display 960 also provides visual feedback of the categories selected in the enable categories menu 920, as will be described below. Bottom portion 950 includes a return to user authorization level screen ("B") button icon 954, which enables the administrator to enable other authorization levels at this point. A linking ("A") button icon 952 is used to link enabled user authorization levels.

Figure 9A:
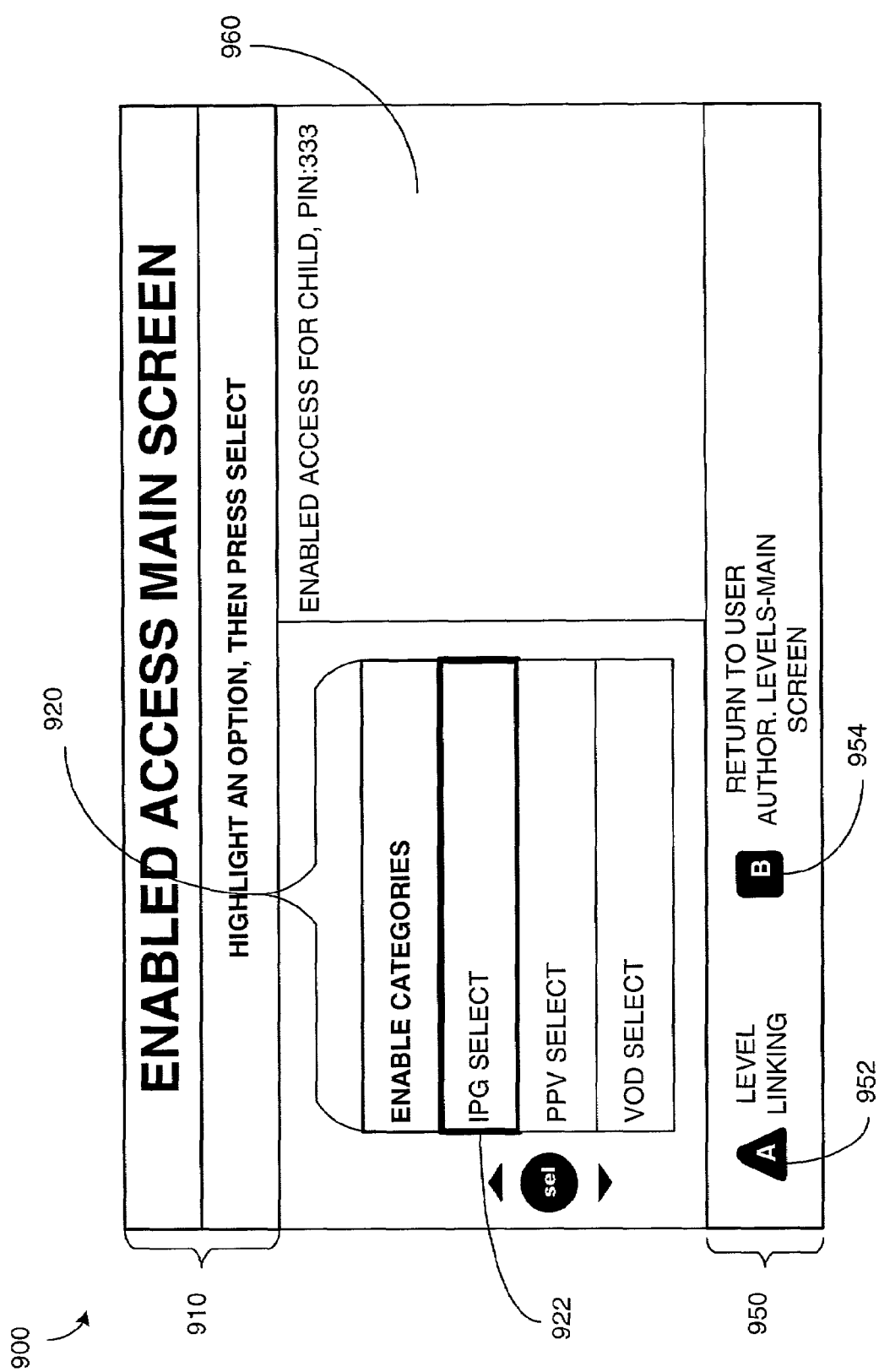
FIG. 9A is a screen diagram of an example enabled access main screen after scrolling through enable categories to the option of enabling by selecting media content in an interactive program guide (IPG), in accordance with one embodiment of the invention.
Figure 9B:
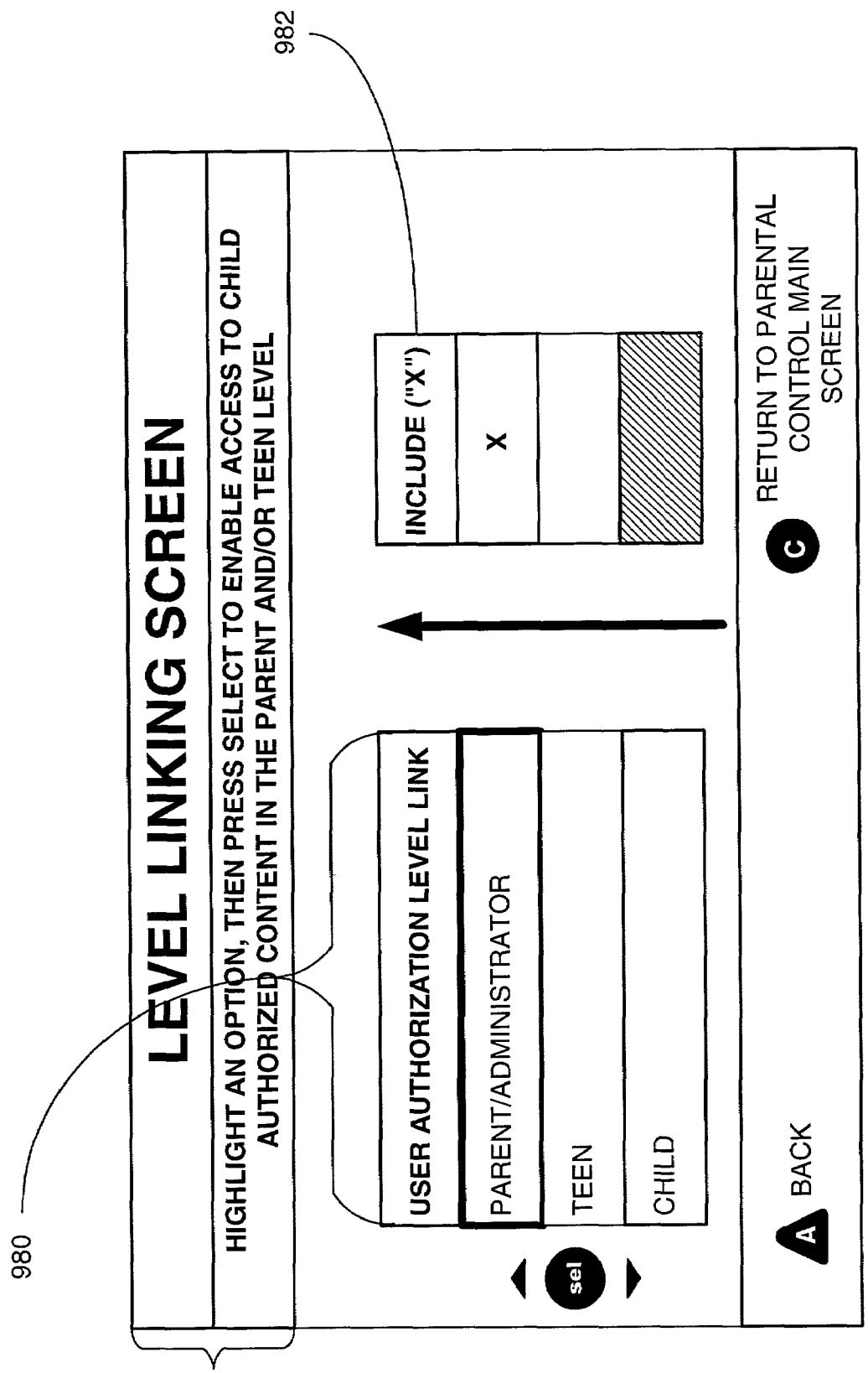
FIG. 9B is a screen diagram of an example level linking screen for enabling media content selected for access in the child authorization level to be accessed in other authorization levels, in accordance with one embodiment of the invention.
Figure 11A:
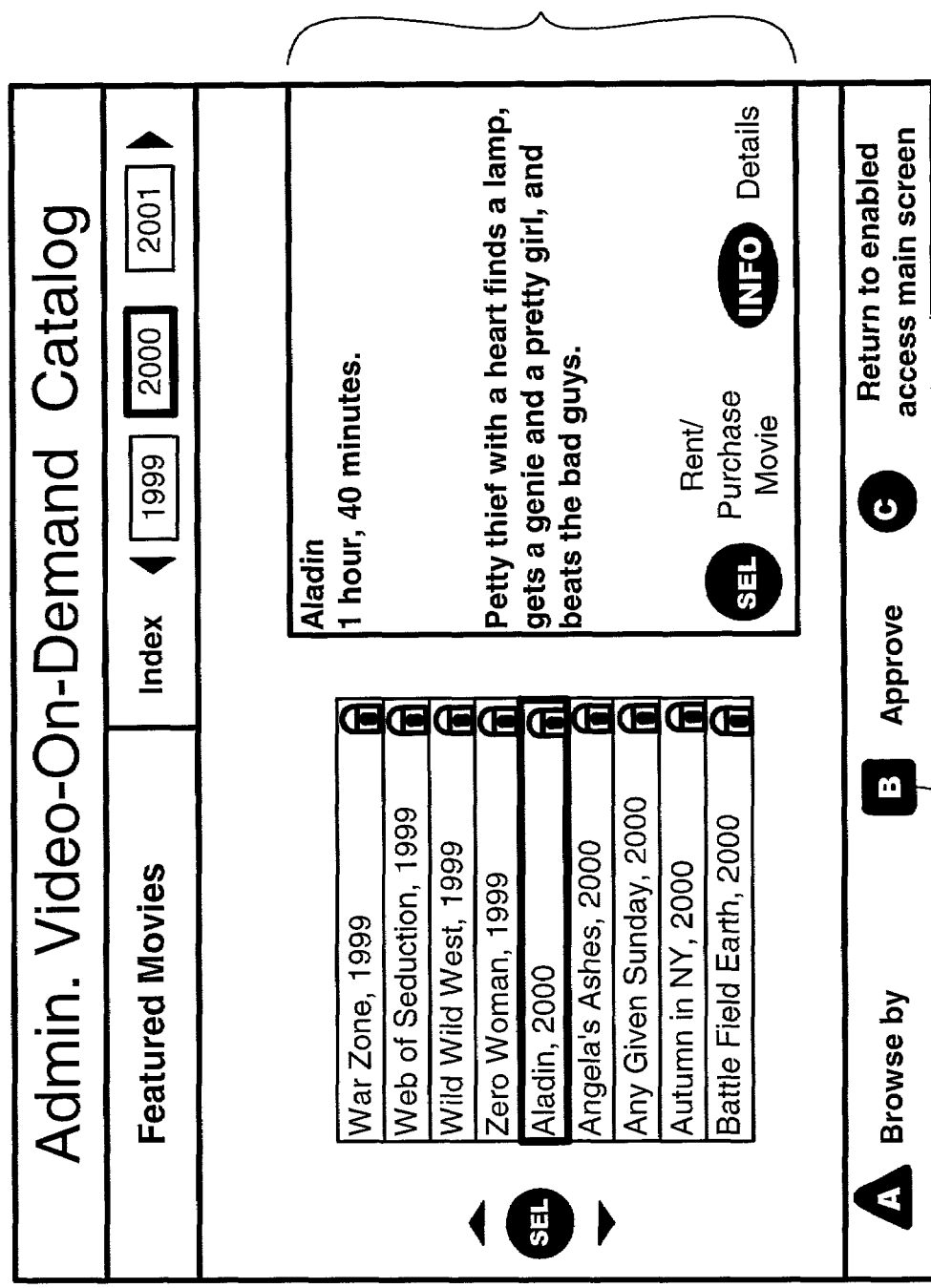
FIG. 11A is a screen diagram of an example administrator video on demand catalog screen evoked from the enabled access screen of FIG. 9A, in accordance with one embodiment of the invention.
Figure 11B:
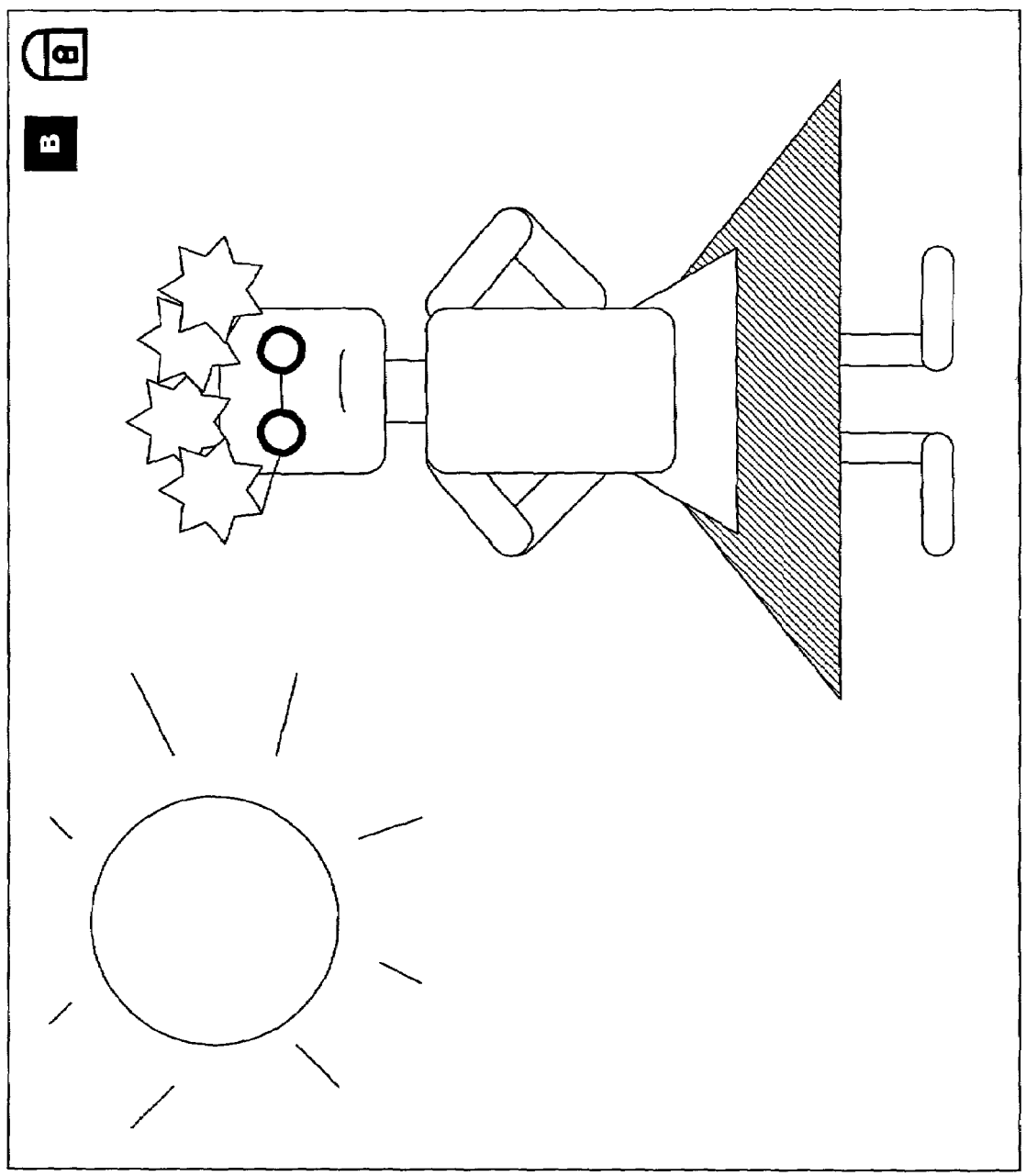
FIG. 11B is a screen diagram of an example administrator real-time display screen of a currently showing media content instance that provides for the ability to enable during the presentation of a media content instance, in accordance with one embodiment of the invention.

FIG. 9B is a screen display of an example level linking screen. As shown, by highlighting and selecting one of the user authorization levels of the user authorization level link menu 980, an "X" (or in some embodiments, another symbol or feedback mechanism) is placed in the include block 982 for the highlighted authorization level to denote that all media content enabled for the child authorization level will be accessible to, in this example, the parent/administrator authorization level.

Assume the administrator has selected the IPG select option under highlight block 922 of FIG. 9A, which results in the display of the administrator IPG screen 1000 of FIG. 10 that preferably only the administrator has access to. Each block 1020 of the administrator IPG screen 1000 preferably includes the title of a media content instance for the corresponding presentation time, along with a parental control icon in the corner of each block that is configurable as non-enabled (closed) or enabled (open). In other embodiments, other configurable symbols can be used in each block 1020, including a stop sign, a traffic signal, an "X" or check mark or other symbol, and even different shades or colors that distinguish between enabled and non-enabled access. This screen 1000 enables the administrator to select media content at the individual media content instance level for enabled viewing for the child authorization level (or any authorization level). By highlighting one of the blocks 1020, such as the block including Little Mermaid, and pressing the approve button icon "B" 1070, the Little Mermaid is enabled as media content that is approved for viewing by a user with PIN access to the child authorization level for that episode, as reflected by the change in the displayed icon of the block (now open) including Little Mermaid depicted in FIG. 10B. Note that the same or similar process can occur when the administrator chooses the VOD, PPV, or WatchTV select option from the enabled access main screen 900 shown in FIG. 9. For example, if the administrator selects the VOD select option from the enabled access main screen 900, the example administrator VOD catalog screen shown in FIG. 11A can be displayed that also provides an approve button icon 1172 for a highlighted option as well as, in some embodiments, the visual feedback of the parental control icon (or other feedback mechanisms or symbols as described above). As another example, if the administrator selected the WatchTV select option from the enabled access screen 900, the administrator can select particular service programming (e.g., CNN, HBO, or ESPN, for example) to watch in real-time that has a parental control icon (or other similar functional equivalents) in the corner of the display screen, such as that shown in the example real-time display screen of FIG. 11B. The administrator can use the remote control device 580 (FIG. 5), in one embodiment, and press the "B" button icon 582 on the remote control device 580, as suggested by the "B" next to the parental control icon, resulting in enabled access for a displayed media content instance.

Figure 12:
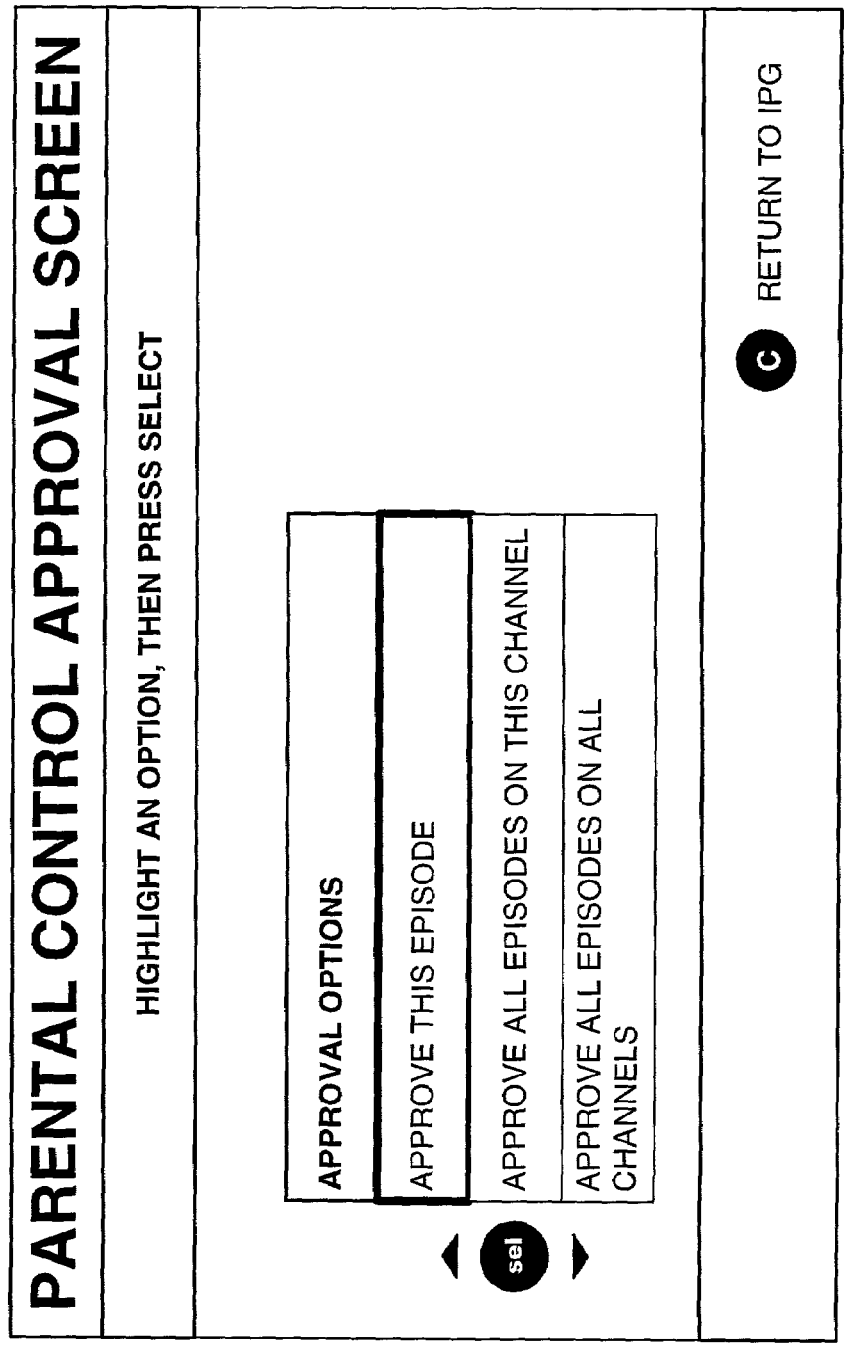
FIG. 12 is a screen diagram of an example parental control approval screen evoked from selecting one of the titles of the administrator IPG screen of FIG. 9A for enabled access, in accordance with one embodiment of the invention.

In other embodiments, after selecting the approve button icon "B" (or other button icons configured with similar functionality) within any of the displayed screens of FIGS. 10A-11B, the administrator can be presented with another screen, such as approval screen 1200 in FIG. 12, that enables the administrator to select Little Mermaid (or other media content instances) for the episode displayed in the administrator IPG screen, VOD catalog, or real-time display screen as described above, or for other episodes on the selected display channel or other display channels.

Figure 13:
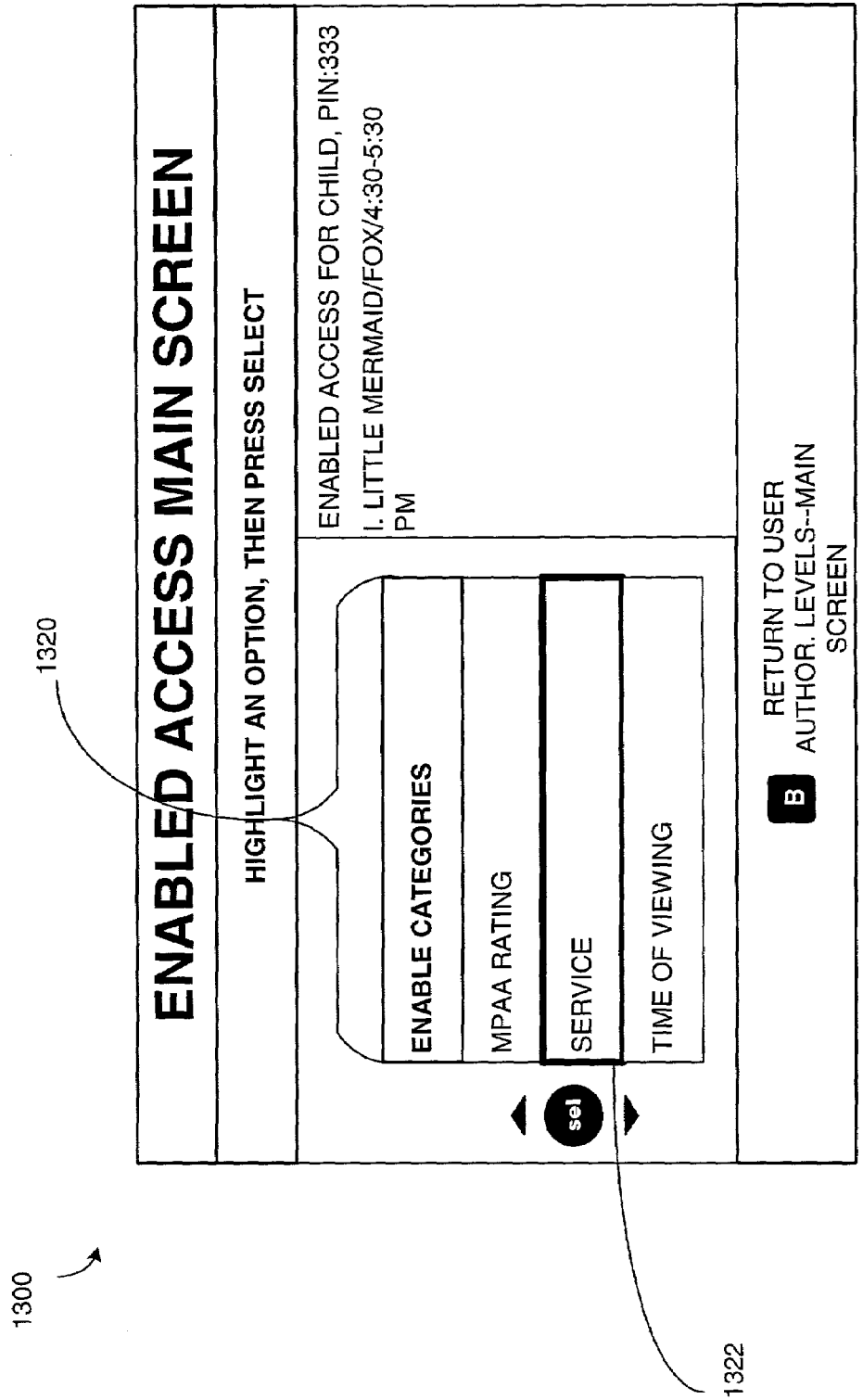
FIG. 13 is a screen diagram of an example enabled access main screen after scrolling to the service category, in accordance with one embodiment of the invention.

FIG. 13 is a screen diagram of an example enabled access main screen 1300 evoked after selecting the enabled access main screen ("C") button icon in the example administrator IPG screen of FIG. 10B, in accordance with one embodiment of the invention. Assume that the administrator has scrolled through the options in the enable categories menu 1320 to the service option, shown highlighted by highlight block 1322. Services include software, games, video on demand, Pay per View, WatchTV (which includes programming such as CNN, HBO, Showtime, etc.), email, Web browser, CD's, DVD's, among others. By selecting the service option, the administrator is presented with the example screen display in FIG. 14.

Assume the user has scrolled through the enable by service menu 1420 of the enabled access service screen 1400 to the highlighted option, WatchTV. Preferably, once within the selected service category (such as WatchTV or the other service screens like games, CD's, etc), each screen (following a selection) takes the administrator to increasing levels of refinement in the enablement of the particular service selected through a series of sub-category screens, as will be described below. In other embodiments, the administrator can be presented with a plurality of overlapping screens, or windows, from which to further refine a particular category. Bottom portion 1450 provides the administrator with the ability to return to enable other user authorization levels ("B" button icon 1454) or to enable by other categories ("C" button icon 1456). In this example, the administrator has highlighted and selected the Watch TV option from the enable by service menu 1420, resulting in the displayed screen of FIG. 15.

Figure 14:
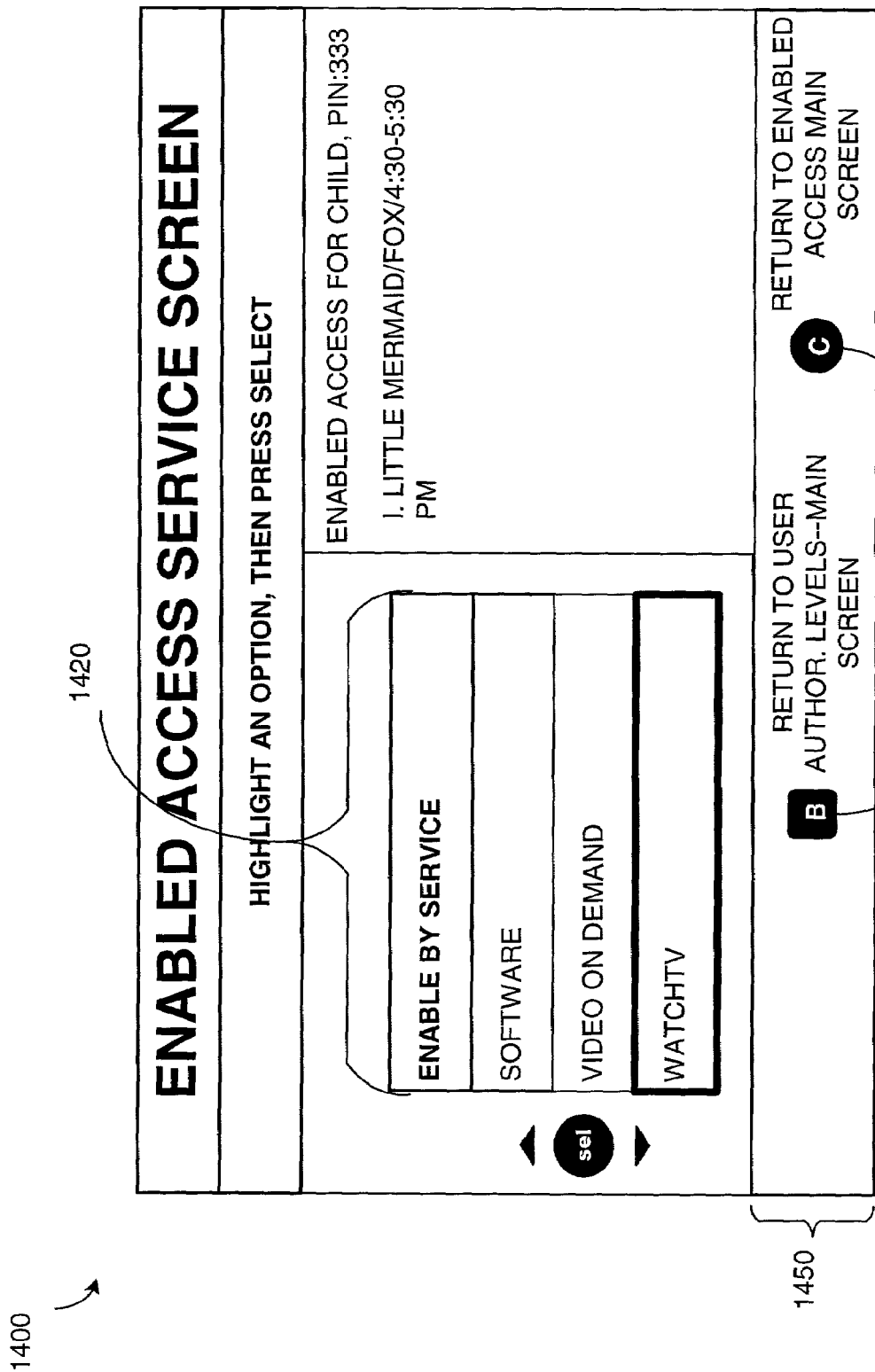
FIG. 14 is a screen diagram of an example enabled access service screen evoked after selecting the service enable category in the example screen of FIG. 13 and scrolling through the enable by service categories, in accordance with one embodiment of the invention.
Figure 15:
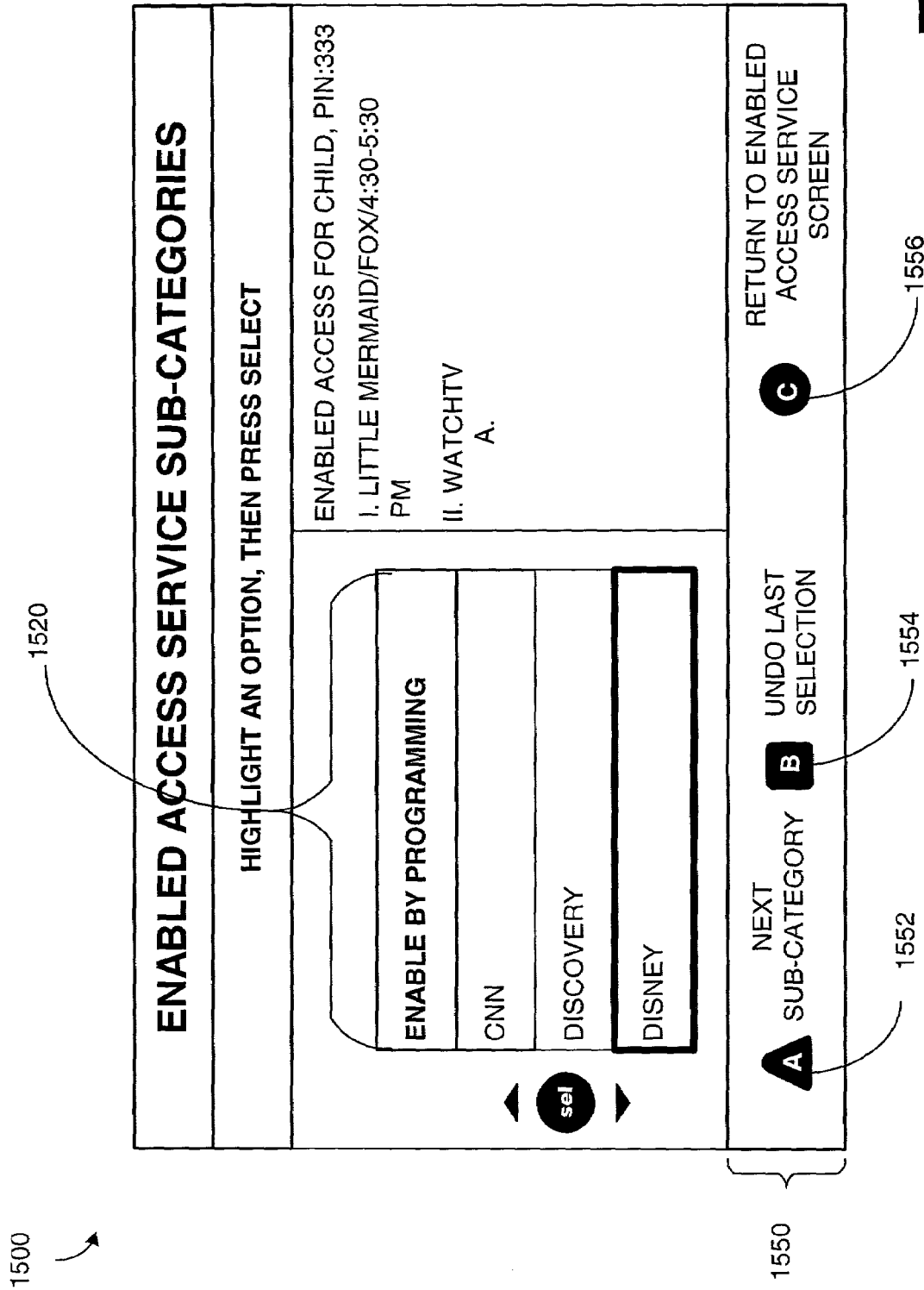
FIG. 15 is a screen diagram of an example enabled access service sub-category screen after selecting the WatchTV service category from the example screen of FIG. 14, in accordance with one embodiment of the invention.

FIG. 15 is a screen diagram of an example enabled access service sub-category screen after selecting the WatchTV service option from the example screen 1400 of FIG. 14, and scrolling through an enable by programming menu 1520, in accordance with one embodiment of the invention. As indicated above, the sub-category screens of FIGS. 15-18 provide for increasing enabling refinement within a selected service category. However, categories like genre, programming, live and/or animated, view time, and others are all categories that can be accessed from the enabled access main screen, such as that shown in FIG. 13, to provide a broader scope of enablement. For instance, the administrator can select the time of viewing option from the enabled access main screen 1300 (FIG. 13), and enable media content for any authorization level for a defined period, such as 2:00 PM to 5:00 PM. If this category was the only one selected for a particular authorization level, then all media content between 2:00 PM to 5:00 PM will be enabled for the particular authorization level. The enabled access service sub-category screen 1500 includes the enable by programming menu 1520, which includes a plurality of programming options available to the administrator in the WatchTV service, such as, for example, CNN, Discovery, and Disney. Bottom portion 1550 provides the administrator the ability to skip to the next sub-category (if for example the administrator does not wish to enable within the current sub-category) via the "A" button icon 1552, undo the last selection via the "B" button icon 1554, or choose another service by navigating to the enabled access service screen by selecting the "C" button icon 1556. Highlighting and selecting the Disney option from the enable by programming menu 1520 results in the screen display of FIG. 16.

Figure 16:
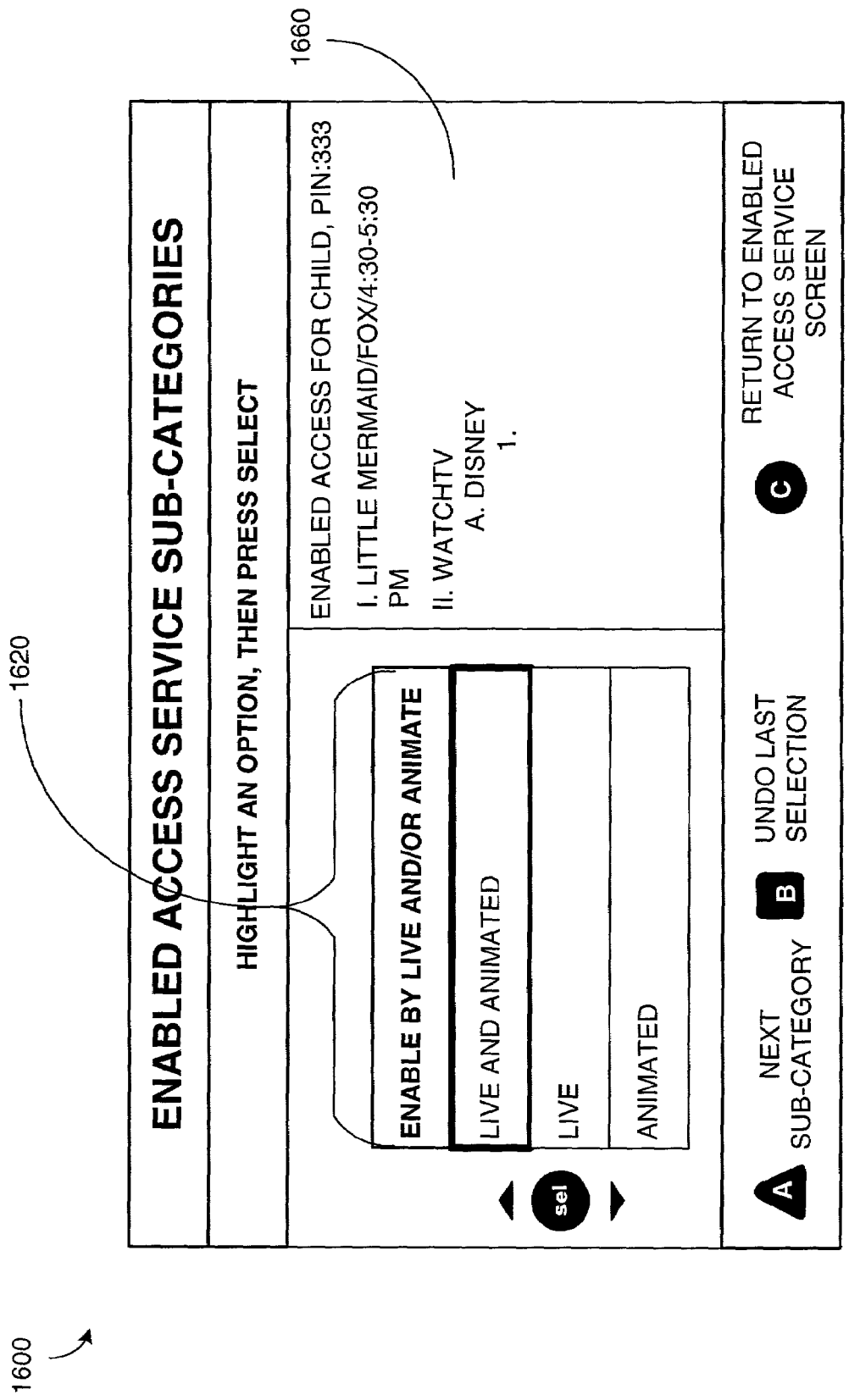
FIGS. 16-18 are screen diagrams of example enabled access service sub-category screens from the example screen in FIG. 15, that provide the administrator with narrowing levels of enablement within the WatchTV service selected in FIG. 15, in accordance with one embodiment of the invention.

FIG. 16 depicts another layer of enabled access service sub-category screen that provides a further level of refinement in the level of access for the child authorization level. As shown, the enable by live and/or animate menu 1620 provides the administrator with options that include live, animated, and live and animated presentations for Disney programming. Subscreen display 1660 shows the previously enabled category of Little Mermaid, as well as the last enabled category of Disney programming in the WatchTV category. If the administrator had completed the enablement for the child authorization level at this point, a user in the child authorization level would, for example through entering a PIN 333, have access to the one episode of Little Mermaid on Fox between 4:30-5:30 PM, as well as access to all Disney programming in the WatchTV service. In this example, assume the administrator selected live and animated option from the enable by live and/or animate menu 1620, which results in the display of the example screen display of FIG. 17.

Figure 17:
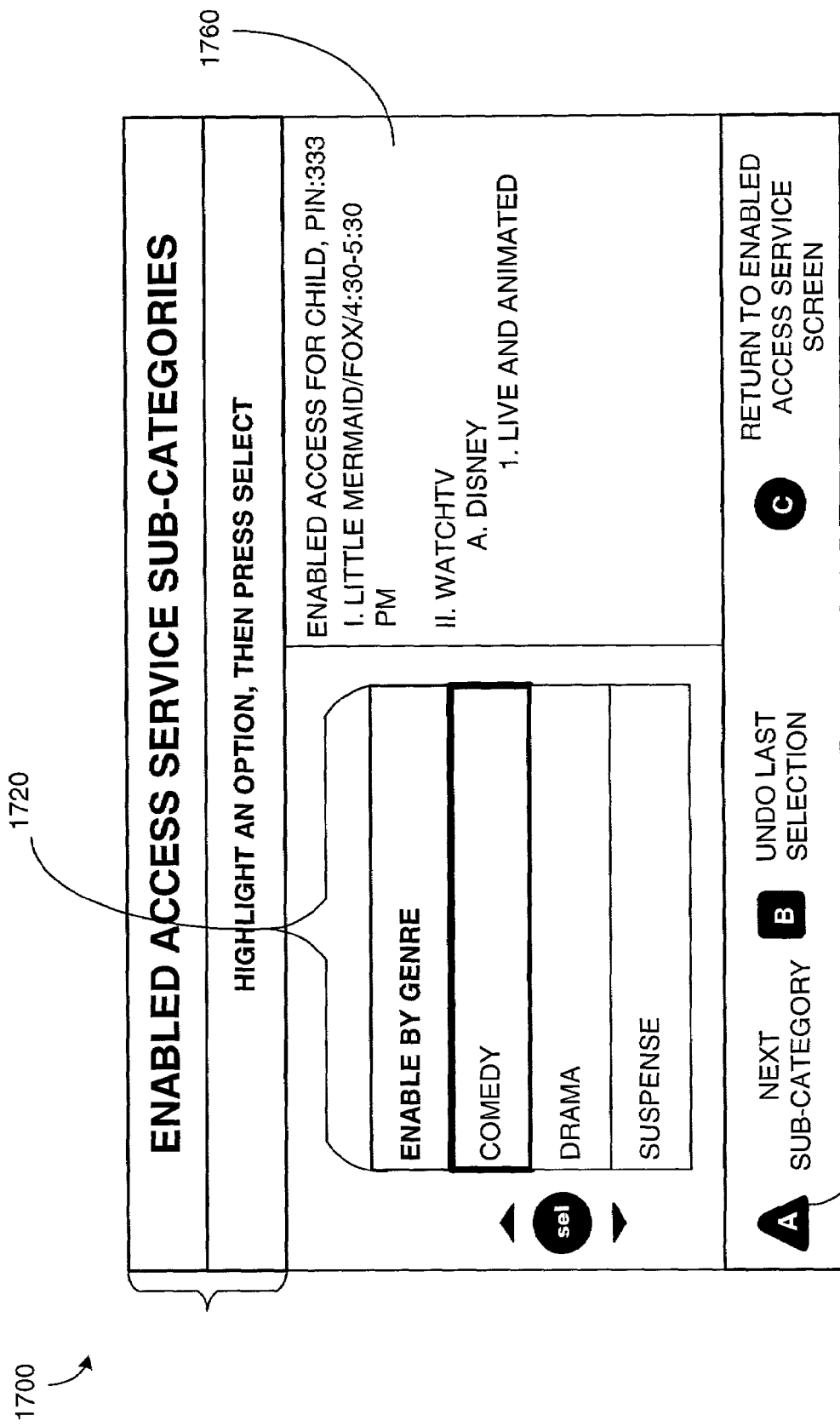

As shown by the sub-screen display 1760 of the enabled access service sub-category screen 1700 of FIG. 17, the administrator has now enabled the child authorization level for access to the Little Mermaid and to all live and animated Disney programming under the WatchTV service. The administrator is presented with an enable by genre menu 1720, which enables the administrator to select whether the child authorization level will have access to comedies, drama, suspense, horror, and other genres within the currently enabled WatchTV categories. In this example, the administrator decides to skip to the next sub-category screen by selecting the "A" button icon 1752, which results in the example screen display of FIG. 18.

Figure 18:
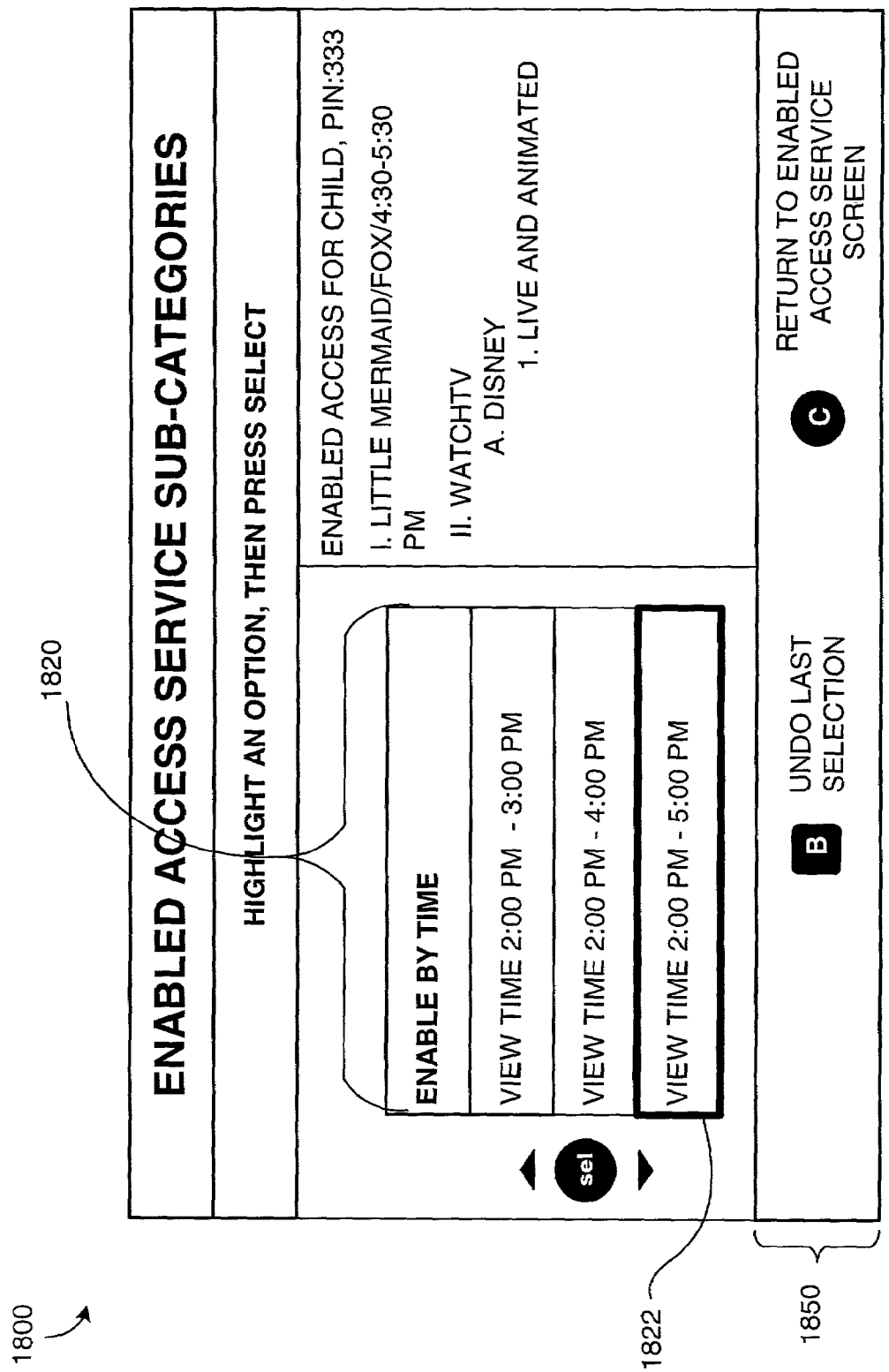
Figure 19:
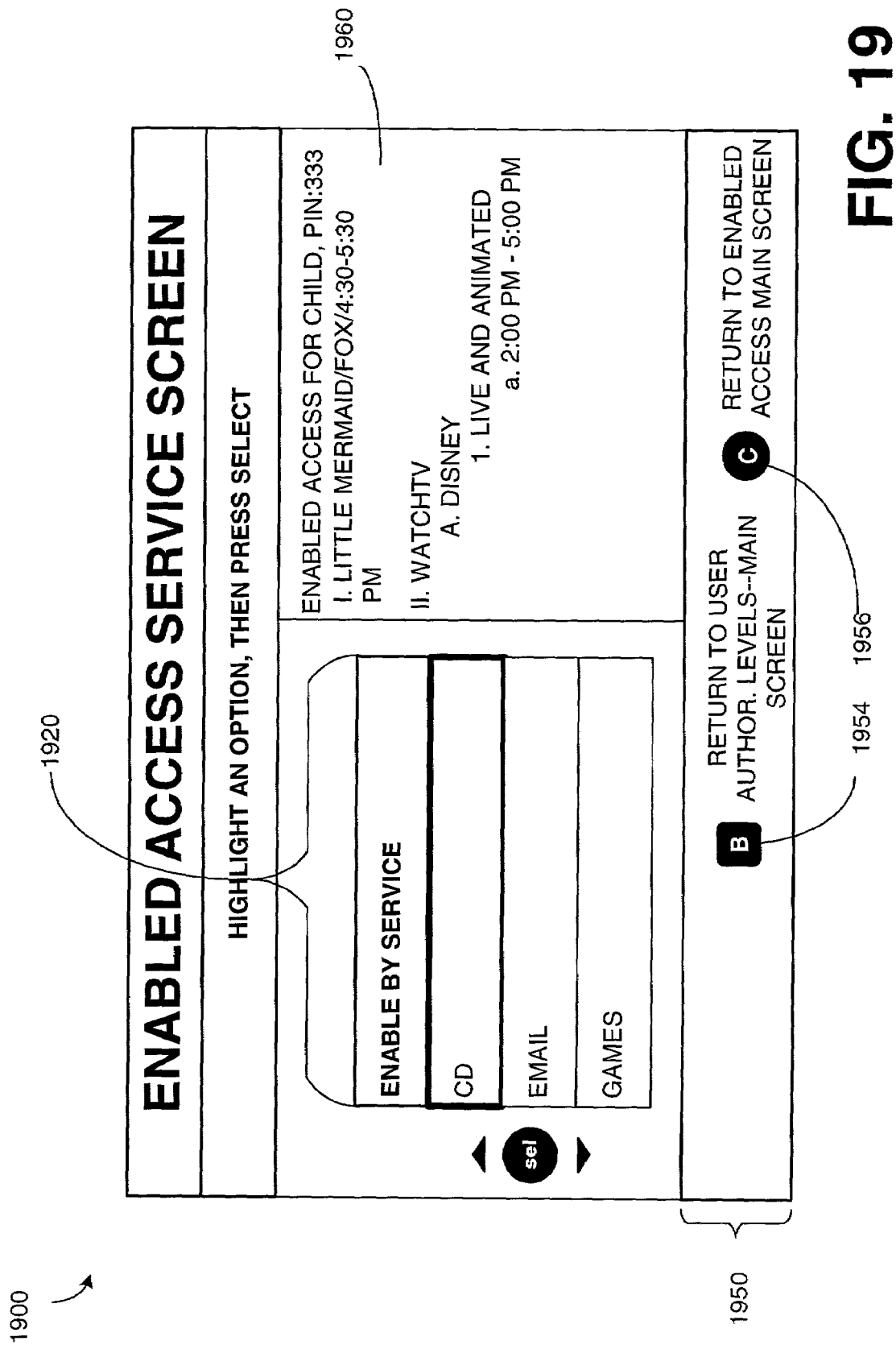
FIG. 19 is a screen diagram of an enabled access service screen following the last enabled sub-category screen selection from the example screen of FIG. 18, in accordance with one embodiment of the invention.
Figure 20:
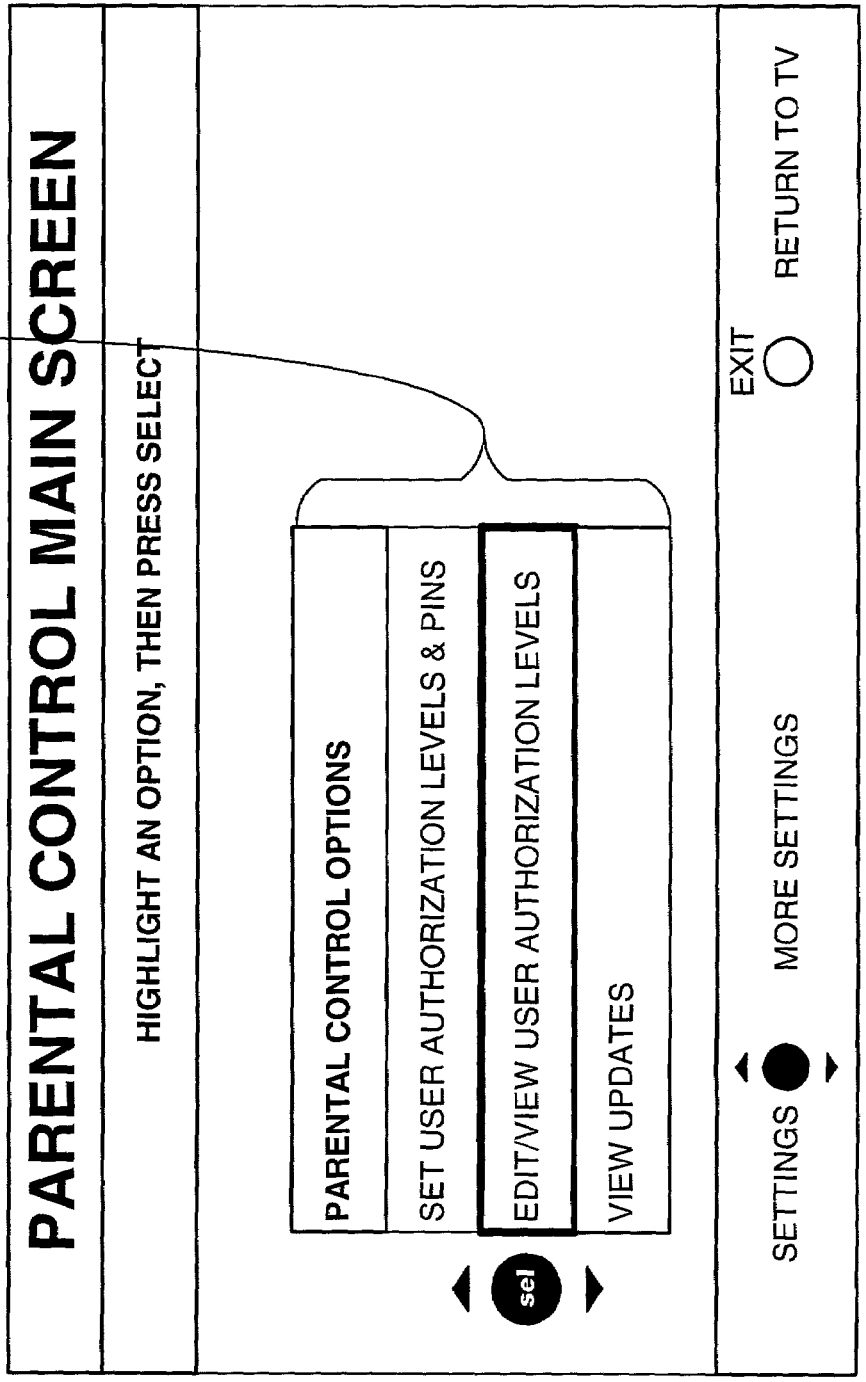
FIG. 20 is a screen diagram of an example parental control main screen, in accordance with one embodiment of the invention.
Figure 21:
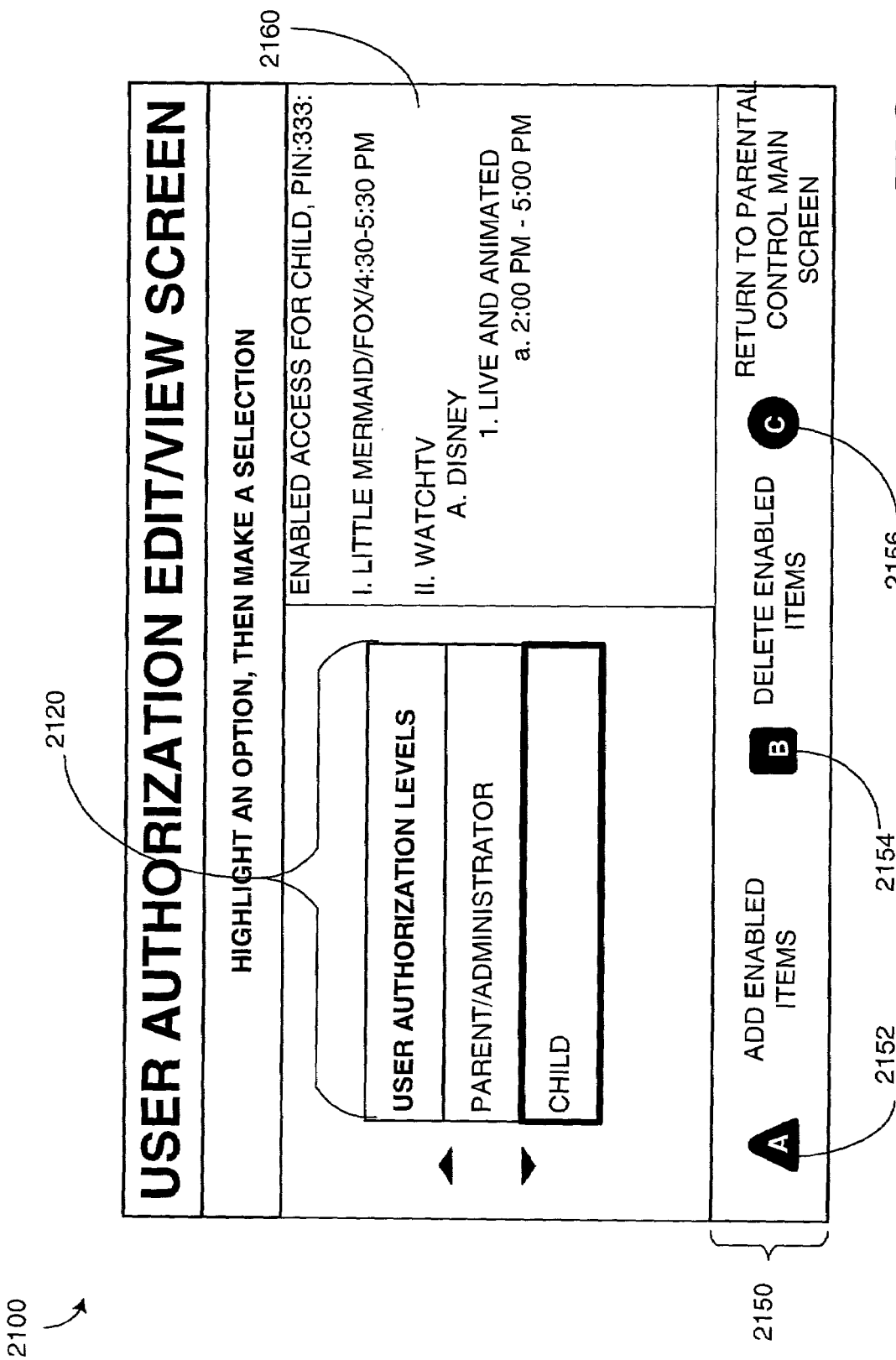
FIG. 21 is a screen diagram of an example user authorization edit/view screen evoked after selecting the edit/view option in the parental control options in the example screen of FIG. 20, in accordance with one embodiment of the invention.

FIG. 18 is a screen diagram of an example enabled access service sub-category screen 1800, in accordance with one embodiment of the invention. Included within this screen 1800 is an enable by time menu 1820 that provides a plurality of view time choices. Assume the administrator has scrolled through the options in the enable by time menu 1820 and has highlighted and selected the 2:00-5:00 PM view time option. The screen resulting from this selection is shown in FIG. 19, which is the enabled access service screen 1900. Note the configured enablement in the sub-screen display 1960, which now enables the child authorization level to have access to the Little Mermaid, and to all live and animated Disney programming within the WatchTV service between 2:00 PM to 5:00 PM.

From the enabled access service screen 1900 of FIG. 19, the administrator can select another service from the enable by service menu 1920, or the administrator can select the service last selected to add other programming and corresponding levels of enablement within other selected programming. For example, if the administrator wants to add other programming or select other services for enablement, the administrator can return to the enabled access main screen 1300 of FIG. 13 by selecting the "C" button icon 1956 in the enabled access service screen 1900. From the enabled access main screen 1300, the administrator can select other services including software, video on demand, etc. If the administrator desires to add other programming, he or she selects the "enable by service" category to evoke the enabled access service screen 1400 (FIG. 14). From the enabled access service screen 1400, the administrator can select the WatchTV service to evoke the enabled access service sub-categories screen 1500 (FIG. 15). From this screen 1500, the administrator can choose other programming, which will then prompt screens providing for further enabling refinement, similar to the mechanisms described above. The administrator is also presented with options in the bottom portion 1950 that enables the administrator to return to the user authorization levels-main screen via selecting the "B" button icon 1954, or return to the enabled access main screen via selecting the "C" button icon 1956.

Assume the administrator has navigated his or her way back to the parental control main screen 2000 (FIG. 20), where the administrator has decided on editing one of the authorization levels (for example, the child authorization level). The administrator highlights and selects the edit/view option in the parental control options menu 2020 of the example parental control main screen 2000, resulting in the edit/view main screen of FIG. 21. The user authorization levels menu 2120 includes the two enabled authorization levels, the administrator and the child. The child authorization level is highlighted, and the corresponding enablement for the child authorization level is shown in the sub-screen display 2160. The bottom portion 2150 provides options for the administrator to add enablement ("A" button icon 2152), delete one or more of the currently enabled selections ("B" button icon 2154), or return to the parental control main screen ("C" button icon 2156). Selecting the "A" button icon 2152 will result in an enabled access main screen, such as the enabled access main screen 900 shown in FIG. 9A, which will allow the administrator to add additional enablement in a process similar to that described above for FIGS. 9 through 19. Suppose the administrator decided that he or she wants to delete one or more of the enablement items selected previously. The administrator can select the "B" button icon 2154, which results in the delete screen 2200 shown in FIG. 22.

Figure 22:
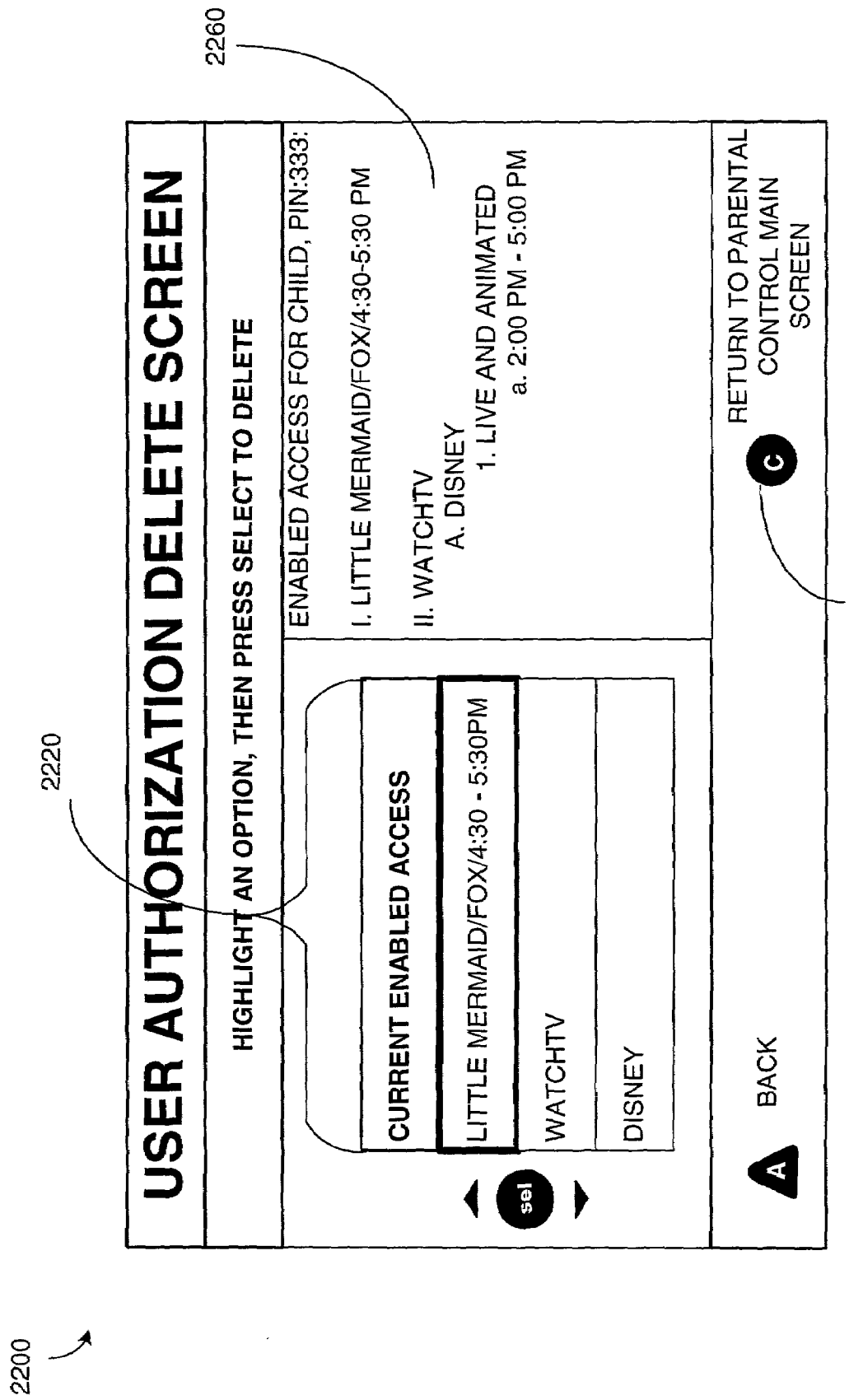
FIG. 22 is a screen diagram of an example user authorization delete screen evoked after selecting the delete enabled items icon in the example screen of FIG. 21, in accordance with one embodiment of the invention.

As shown in the delete screen 2200 of FIG. 22, the administrator is presented with a current enabled access menu 2220, which reflects the items previously enabled, as is also reflected in the sub-screen display 2260. Selecting one of the enabled access options from the current enabled access menu 2220 will result in the deletion of the highlighted option. Assume the user decides to retain all of his or her selections for the child authorization level, and thus returns to the parental control main screen via selection of the "C" button icon 2256.

Figure 23:
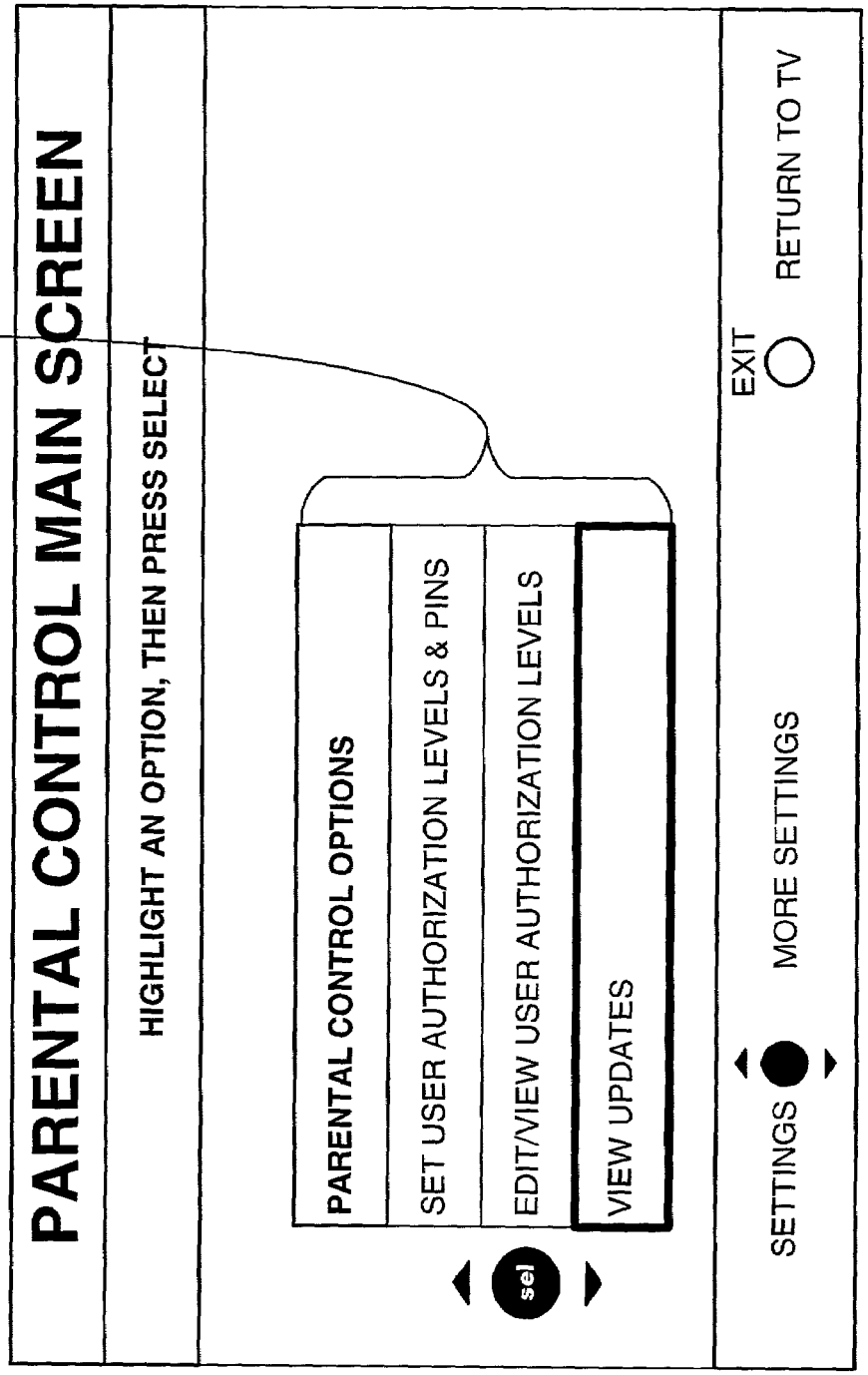
FIG. 23 is a screen diagram of an example parental control main screen evoked after selecting the return to parental control main screen icon in the example screen of FIG. 22, in accordance with one embodiment of the invention.
Figure 24:
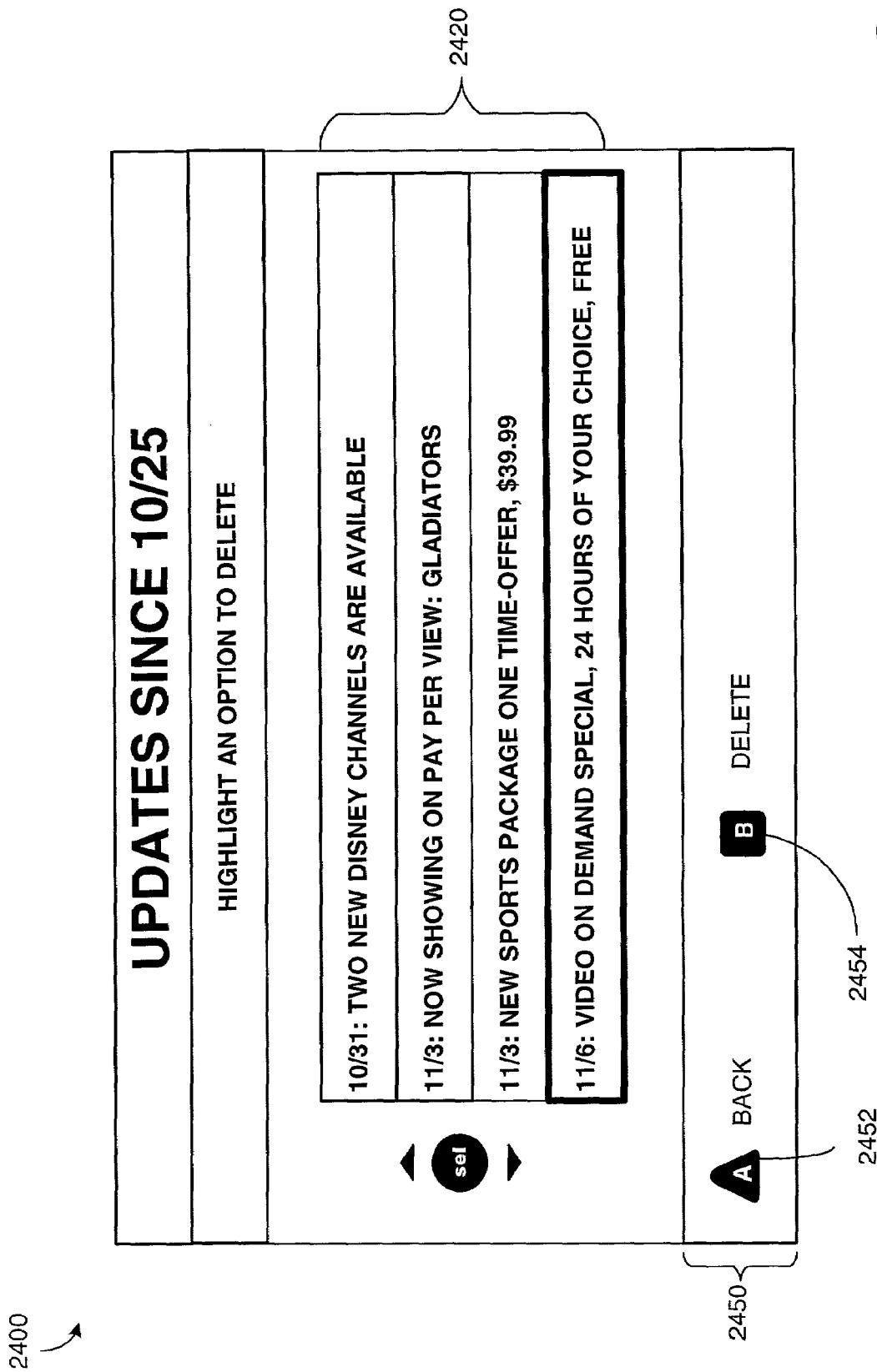
FIG. 24 is a screen diagram of an example updates screen evoked after selecting view updates in the parental control options in the example screen of FIG. 23, in accordance with one embodiment of the invention.

FIG. 23 is a screen diagram of an example parental control main screen evoked from the delete screen of FIG. 22, in accordance with one embodiment of the invention. In this example screen 2300, the administrator has scrolled to and highlighted the view updates option of the parental control options menu 2320. After selecting the highlighted option, the example updates screen 2400 of FIG. 24 is presented, which preferably lists the updates that have occurred since the last time the administrator has entered the parental control screens as an administrator. Information such as the addition of new channels and services, and/or specials, or other events that the administrator or his or her household members may have an interest in are displayed in the updates screen. Such updates can occur in banners displayed on various enabled display channels, such as in an IPG screen, for example. However, if the banners occur on display channels or during services that have not been enabled, the updates screen is one mechanism to provide the administrator with an update of all current subscriber events. After reviewing the updates, the administrator can choose to delete the updates via the delete button icon "B" 2454, or retain for future reference and just return to the parental control main screen via the back button icon "A" 2452.

FIG. 25 is a screen diagram of an example IPG for the child authorization level enabled via the previous display screens. As noted, a user entering a PIN 333 to access media content enabled for the child authorization level is presented only with media content that was enabled by the administrator. This fact applies to all display screens (e.g., VOD, PPV, WatchTV, etc.) presented to the user under the child authorization level, such as the IPG screen 2500. Note that non-enabled media content is blocked out, and thus inaccessible to the user under this level. In other embodiments, only the blocks that have enabled titles are shown, with no empty blocks or channel numbers displayed. Further, upon selecting a title for viewing, an attempt to access a non-enabled display channel (or "running into" a time slot or un-authorized media content instance at the end of the presentation of an authorized media content instance) or otherwise unauthorized media content will result in, one embodiment, a "Channel not available" screen (not shown). In such a screen, an additional message can be provided that alerts the user to the time remaining before the next authorized presentation. In other embodiments, the user can be automatically tuned to authorized media content. In some embodiments, access to enabled media content can be based on the scheduled times of the IPG, or in other embodiments, can be tied to meta data that identifies the authorized media content.

As described above, access to media content is enabled for real-time access. However, in some embodiments, particularly embodiments where access was enabled for a particular time period, media content that is enabled that falls outside of the enabled time period can still be recorded to the storage device 473 (FIG. 4) of the DHCT 16 (FIG. 4) and presented at a later time. A barker (not shown) can be presented, in some embodiments, that alerts the user to the existence of a time conflict, and provide the administrator the option to permanently record for later enabled viewing. Preferably, only enabled media content can be downloaded to the storage device 473 (FIG. 4), and thereafter retrieved for enabled access. Further, even rewinding through the media content temporarily stored in the storage device 473 will result in a display of the frames that were enabled.

The parental control system 468 of the present invention can be implemented in hardware, software, firmware, or a combination thereof. In the preferred embodiment(s), the parental control system 468 is implemented in software or firmware that is stored in a memory and that is executed by a suitable instruction execution system. If implemented in hardware, as in an alternative embodiment, the parental control system 468 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The parental control system 468, which preferably comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred embodiments" are merely possible examples of implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Therefore, having thus described the invention, at least the following is claimed:

1. A method for controlling viewer access to media content, comprising:
   providing interactive user interfaces on a screen that enables an administrator to positively define media content for access by a user for a designated authorization level;
   enabling the user to access media content enabled for a first authorization level;
   displaying a media content instance enabled for the first authorization level on a display screen;
   simultaneously displaying an icon on the display screen to indicate whether the media content is enabled for a second authorization level; and
   simultaneously displaying an indicator icon that if selected results in enabled access for the displayed media content instance without interrupting the display.

2. The method of claim 1, wherein the icon is displayed in a corner of the display screen.

3. The method of claim 1, wherein the media content is displayed in real-time.

4. The method of claim 1, wherein the icon comprises a parental control icon.

5. The method of claim 1, wherein the first authorization level is an administrative authorization level and the second authorization level is a child authorization level.

6. The method of claim 1, wherein the icon comprises a lock.

7. The method of claim 1, further comprising, allowing the user to enable the media content for the second authorization level.

8. The method of claim 1, further comprising, displaying an approval screen to the user to allow the user to enable the media content for the second authorization level.

9. The method of claim 8, further comprising, receiving an input from the user.

10. The method of claim 9, further comprising, enabling the media content for the second authorization level.

11. The method of claim 1, further comprising, displaying an approval screen to the user to allow the user to disable the media content for the second authorization level.

12. The method of claim 11, further comprising, disabling the media content for the second authorization level.

13. The method of claim 1, further comprising displaying an indicator near the icon, the indicator indicating a button to press on a remote control to display an approval screen to enable the media content for the second authorization level.

* * * * *